(12) United States Patent
Miyabe et al.

(10) Patent No.: US 9,552,501 B2
(45) Date of Patent: Jan. 24, 2017

(54) CARD READER AND CONTROL METHOD OF CARD READER

(71) Applicant: NIDEC SANKYO CORPORATION, Nagano (JP)

(72) Inventors: Takaaki Miyabe, Nagano (JP);
Yoshihito Komatsu, Nagano (JP);
Kazutoshi Ishikawa, Nagano (JP);
Katsuhisa Higashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/444,102

(22) Filed: Jul. 28, 2014

(65) Prior Publication Data
US 2014/0353379 A1  Dec. 4, 2014

Related U.S. Application Data

(63) Continuation of application No. 13/254,210, filed as application No. PCT/JP2010/001433 on Mar. 3, 2010, now Pat. No. 8,824,073.

(30) Foreign Application Priority Data

Mar. 5, 2009 (JP) ................................. 2009-052733
Sep. 28, 2009 (JP) ................................. 2009-223073

(51) Int. Cl.
*G06K 7/02* (2006.01)
*G11B 25/04* (2006.01)
(Continued)

(52) U.S. Cl.
CPC .............. *G06K 7/082* (2013.01); *G06K 7/084* (2013.01); *G06K 13/08* (2013.01); *G06K 13/0875* (2013.01); *G11B 5/00808* (2013.01)

(58) Field of Classification Search
None
See application file for complete search history.

(56) References Cited

U.S. PATENT DOCUMENTS 3,460,244 A * 8/1969 Metz ...................... G11B 5/295
29/423
6,141,161 A * 10/2000 Sato ........................ G06K 7/084
235/449

(Continued)

FOREIGN PATENT DOCUMENTS

JP          9-22502        1/1997
JP          10-134131      5/1998
(Continued)

OTHER PUBLICATIONS

International Search Report for Application No. PCT/JP2010/001433 mailed on Apr. 13, 2010.

*Primary Examiner* — Dismery Mercedes
(74) *Attorney, Agent, or Firm* — Frommer Lawrence & Haug LLP

(57) ABSTRACT

The present invention is to provide a card reader that can prevent the illegal acquisition of magnetic information recorded on a magnetic stripe, based on an output signal from a pre-head. More specifically described, in a card reader having a card insertion slot for guiding a magnetic card having a magnetic stripe to a transport passage and a pre-head arranged in the vicinity of the card insertion slot for detecting the presence of the magnetic stripe, the pre-head is equipped with a head portion having at least one pair of magnetic cores arranged to be opposite from each other having a magnetic gap between them and coils wound around a pair of the magnetic cores; and a signal different from that of the magnetic information recorded on the magnetic stripe is output from the pre-head.

5 Claims, 17 Drawing Sheets

(51) Int. Cl.
*G06K 7/08* (2006.01)
*G06K 13/08* (2006.01)
*G11B 5/008* (2006.01)

(56) References Cited

U.S. PATENT DOCUMENTS

| | | | | |
|---|---|---|---|---|
| 6,398,115 | B2* | 6/2002 | Krause | G06K 7/14 235/462.01 |
| 6,446,872 | B1* | 9/2002 | Imai | G06K 13/08 235/475 |
| 6,574,058 | B1* | 6/2003 | Aruga | G06K 7/084 360/2 |
| 6,830,182 | B2* | 12/2004 | Izuyama | G06K 7/084 235/449 |
| 6,991,163 | B2* | 1/2006 | Akabane | G06K 7/084 235/435 |
| 7,246,752 | B2* | 7/2007 | Brown | G06K 19/06187 235/380 |
| 7,377,434 | B2* | 5/2008 | Wakabayashi | G06K 7/084 235/449 |
| 7,489,460 | B2 | 2/2009 | Kuribayashi et al. | |
| 7,641,124 | B2 | 1/2010 | Brown et al. | |
| 8,654,463 | B2 | 2/2014 | Xu et al. | |
| 8,824,073 | B2* | 9/2014 | Miyabe | G06K 7/084 235/492 |
| 2002/0158125 | A1* | 10/2002 | Takita | G06K 7/084 235/449 |
| 2003/0192948 | A1* | 10/2003 | Izuyama | G06K 7/084 235/449 |
| 2004/0012875 | A1* | 1/2004 | Wood | 360/55 |
| 2005/0218227 | A1* | 10/2005 | Takita | G06K 13/08 235/441 |
| 2007/0131768 | A1* | 6/2007 | Wakabayashi | 235/449 |
| 2007/1013980 | | 6/2007 | Kuribayashi et al. | |
| 2007/0158432 | A1* | 7/2007 | Tadamasa | G06K 13/08 235/480 |
| 2008/0201264 | A1* | 8/2008 | Brown | G06Q 20/3674 705/67 |
| 2011/0006112 | A1* | 1/2011 | Mueller | G06K 7/082 235/379 |
| 2011/0135092 | A1* | 6/2011 | Lehner | G06K 7/084 380/252 |

FOREIGN PATENT DOCUMENTS

JP 2002-74607 3/2002
JP 2002-189987 7/2002

* cited by examiner

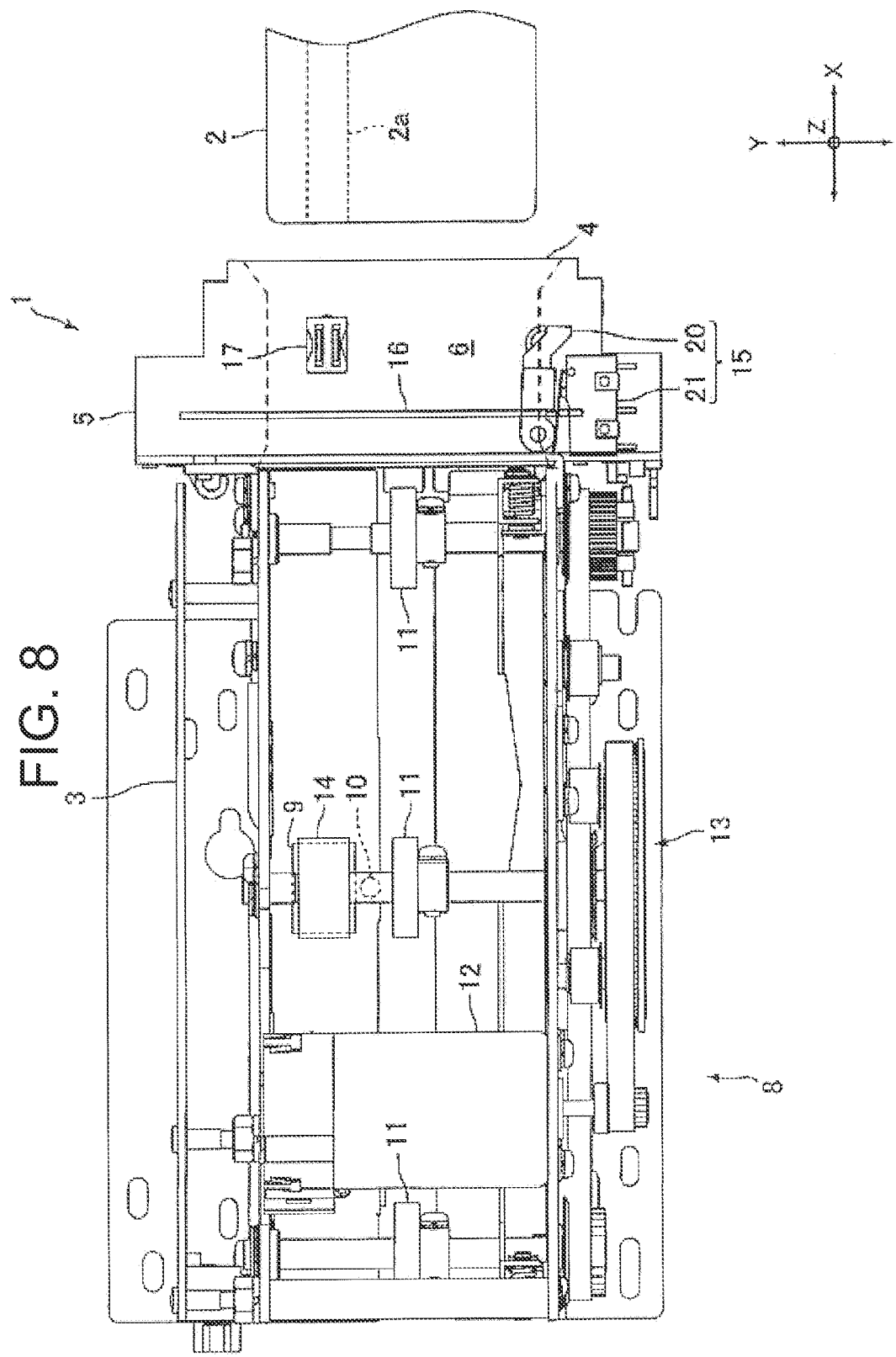

CARD READER AND CONTROL METHOD OF CARD READER

The present application is a continuation application of U.S. application Ser. No. 13/254,210, filed on Sep. 20, 2011, which claims priority from PCT Patent Application No. PCT/JP2010/001433 filed on Mar. 3, 2010, which claims priority from Japanese Patent Application Nos. JP 2009-052733 filed on Mar. 5, 2009, and JP 2009-223073 filed on Sep. 28, 2009, the disclosures of which are incorporated herein by reference in its entirety.

FIELD OF THE INVENTION

The present invention relates to a card reader that reads magnetic data recorded on cards and to its control method.

DESCRIPTION OF RELATED ART

A card reader having a pre-head that detects the presence of a magnetic stripe is used in the following manner, for example. The card conventionally used in financial institutions such as banks to realize cashless transactions and ID verification is a magnetic card having a magnetic stripe formed on a surface of a plastic substrate. Magnetic data is recorded/reproduced by a card reader device (including a card reader/writer). More specifically described, the card reader takes a magnetic card from a card insertion slot into a transport passage and records/reproduces magnetic information while transporting the card with drive rollers to a predetermined position.

Also, among card readers, there is a card reader having a pre-head for detecting that a magnetic card is inserted at a card insertion slot. The pre-head detects the presence of the magnetic stripe and sends to a CPU an output signal based on the magnetic data recorded on the magnetic stripe. The CPU that has received it opens a shutter to the transport passage and drives a drive motor (see Japanese Patent Application 2002-74607 Unexamined Publication ("JP 2002-74607"), for example).

The pre-head and a circuit board (including a CPU) that detects the output signal of the pre-head are often positioned at physically distant places from each other, and both are generally connected to each other by a cable or the like.

Conventionally, a card reader that reads magnetic data recorded on a card is widely used. In this kind of card reader, magnetic data recorded on a card is read by a magnetic head arranged in the card transport passage in which the card is transported. However, in the industry where card readers are used, conventional card readers are vulnerable to a crime called "skimming", in which a criminal attaches a signal wire to the magnetic head to illegally acquire magnetic data on cards.

For this reason, a card reader configured to prevent skimming has been proposed (see Japanese Patent Application 2002-189987 Unexamined Publication ("JP 2002-189987"), for example). In a card reader disclosed in JP 2002-189987, a demodulation circuit, which demodulates the magnetic data recorded on the card based on the output signal from coils that are the components of the magnetic head, and an encryption circuit, which encrypts the magnetic data demodulated by the demodulation circuit using a predetermined encryption function and key data, are stored in the case of the magnetic head together with a main portion of the magnetic head. For this reason, only encrypted magnetic data is output from the magnetic head. Therefore, it is possible in this card reader to prevent skimming, in which the magnetic data on the card is illegally acquired from the signal wire attached to the magnetic head.

SUMMARY OF THE INVENTION

However, in the card reader disclosed in JP 2002-74607, when a lead wire is illegally attached to an output terminal of the pre-head or to a cable or the like linking the pre-head and the circuit board, there is a risk that the output signal from the pre-head could be analyzed and therefore, the magnetic data recorded on the magnetic stripe may be leaked (stolen).

The present invention is devised considering such a problem, and the first objective is to provide a card reader capable of preventing the illegal acquisition of magnetic data recorded on a magnetic stripe based on the output signal from the pre-head.

Also, as described above, in the card reader disclosed in JP 2002-189987, skimming can be prevented. However, since the demodulation circuit and the encryption circuit are stored inside the case of the magnetic head in this card reader, the size of the magnetic head has to be large. Therefore, in the card reader disclosed in JP 2002-189987, it is difficult to minimize the size of the card reader. Also, the magnetic head in which the demodulation circuit and the encryption circuit are stored inside the case is expensive; therefore, the card reader disclosed in JP 2002-189987 increases the cost of the card reader.

Therefore, the (second) objective of the present invention is to provide a card reader which is capable of preventing the illegal acquisition of magnetic data on a card and which can be minimized in size and manufactured at lower cost. Also, (another) objective of the present invention is to provide a control method for a card reader which is capable of preventing the illegal acquisition of magnetic information on a card and which can be minimized in size and manufactured at lower cost.

To achieve the above (first) objective, the present invention provides the following:

(1) A card reader comprising a card insertion slot, which guides a magnetic card having a magnetic stripe to a transport passage, and a pre-head arranged in the vicinity of the card insertion slot for detecting the presence of the magnetic stripe, wherein the pre-head is equipped with a head portion having at least one pair of magnetic cores arranged to be opposite from each other having a magnetic gap between them and coils wound around a pair of the magnetic cores, and a signal different from that of the magnetic information recorded on the magnetic stripe is output from the pre-head.

According to the present invention, the card reader has the card insertion slot and the pre-head, the pre-head is equipped with the head portion having at least one pair of the magnetic cores arranged to be opposite from each other having the magnetic gap between them and the coils wound around a pair of the magnetic cores, and a signal different from that of the magnetic data recorded on the magnetic stripe is output from the pre-head; therefore, the illegal acquisition of the magnetic information is prevented.

In other words, when a signal indicating the magnetic data recorded on the magnetic stripe is output from the pre-head, there is a risk that the magnetic information may be leaked (stolen) through the analysis of the output signal; however, when a signal different from that of the magnetic information recorded on the magnetic stripe is output as in the present invention, the magnetic information cannot be acquired even through the analysis of the output signal.

Therefore, even if a lead wire is illegally attached to an output terminal of the pre-head or to a cable or the like linking the pre-head and a circuit board, the leaking and illegal acquisition of the magnetic information recorded on the magnetic stripe can be prevented.

Note that "a signal different from that of the magnetic information recorded on the magnetic stripe" may be of any signal form such as step signals, sinusoidal signals and pulse signals as long as it is not the same form as that of the magnetic data.

(2) A card reader wherein the pre-head is provided with a signal converting means that converts the output signal from the head portion into a different signal.

According to the present invention, the signal converting means is provided to the pre-head for converting the output signal from the head portion into a different signal; therefore, even if the output from the signal converting means is illegally acquired, the magnetic information cannot be acquired even though the output is demodulated and deciphered, thus preventing the illegal acquisition of the magnetic information.

Also, the pre-head provided with the signal converting means is different in output from the one without the signal converting means. Therefore, if the circuit board and the like is manufactured specific to the pre-head which has the signal converting means, the illegal replacement of the pre-head with a counterfeit product (a pre-head without the signal converting means) at maintenance can be prevented.

(3) A card reader wherein the signal converting means is provided with a detection circuit for detecting the output signal from the head portion and an output circuit for outputting a signal different from the output signal.

According to the present invention, provided to the signal converting means are the detection circuit for detecting the output signal from the head portion and the output circuit for outputting a signal different from the output signal; therefore, there is no need to provide a detection circuit to the circuit board including a CPU that controls the driving of each portion of the card reader. Therefore, while preventing the illegal replacement with a counterfeit product at maintenance, it prevents the illegal acquisition of the magnetic data.

(4) A card reader wherein the signal converting means is stored inside a case covering a pair of the magnetic cores and the coils.

According to the present invention, the above mentioned signal converting means is stored inside the case which covers a pair of the magnetic cores and the coils; therefore, it hinders a lead wire from being connected to the signal converting means; this prevents the magnetic data from being leaked (stolen) from the signal converting means, thus preventing the illegal acquisition of the magnetic data.

(5) A card reader wherein the pre-head is a multi-channel magnetic head in which the head portion is arranged in multiple to be equivalent to a plurality of data tracks, and a common bobbin having a coil wound around is attached to a plurality of the magnetic cores.

According to the present invention, the above-mentioned pre-head is a multi-channel magnetic head in which the head portion is provided in multiple to be equivalent to a plurality of data tracks, and a common bobbin as the signal converting means, having the coil wound around, is attached to a plurality of the magnetic cores; therefore, a signal different from that of the magnetic data recorded on the magnetic stripe is output from the pre-head.

In other words, a multi channel magnetic head is normally equipped with a plurality of bobbins and coils so that multiple channel signals are obtained from a plurality of the coils. In the present invention, in contrast, a common bobbin is attached to a plurality of the coils. In this way, the channel signals created by synthesizing a plurality of channel signals, not just a plurality of channel signals, are output; therefore, it is difficult to acquire the magnetic data even though the output signal is analyzed. Thus, even when a lead wire is illegally attached to an output terminal of the pre-head or to a cable linking the pre-head and the circuit board, the leaking and illegal acquisition of the magnetic data recorded on the magnetic stripe can be prevented.

To achieve the above (second) objective, in a card reader for reading magnetic data recorded on a card, a card reader of the present invention is provided with a magnetic head for reading magnetic data, which has a reading core and a reading-side coil wound around the reading core, and a non-reading current-generating means for generating to the reading-side coil a non-reading current other than the reading current generated to the reading-side coil when the magnetic data is read.

The card reader of the present invention is provided with the non-reading current generating means for generating to the reading-side coil a non-reading current other than the reading current generated to the reading-side coil when the magnetic data is read. For this reason, if the non-reading current is generated to the reading-side coil except for the period of time when the magnetic data is being read, even if a criminal attaches a signal wire to the magnetic head and acquires the waveform of the current generated to the reading-side coil, it will be difficult for him to distinguish between the reading current and the non-reading current. Therefore, the criminal will have difficulty to acquire accurate magnetic information based on the reading current. Also, if the non-reading current is generated to the reading-side coil when the magnetic data is read, even if a criminal attaches a signal wire to the magnetic head and acquires the waveform of the current flowing through the reading-side coil, it will be difficult for the criminal to acquire accurate magnetic information based on the reading current since the non-reading current is superimposed on the reading current. Consequently the present invention can prevent the illegal acquisition of the magnetic information on the card.

In the present invention, since the illegal acquisition of the magnetic information can be prevented without the demodulation circuit or the encryption circuit being arranged in the magnetic head, the magnetic head can be minimized in size and the cost of the magnetic head can be reduced, compared to the card reader disclosed in JP 2002-189987. Thus, in the present invention, the card reader can be minimized in size and manufactured at lower cost.

In the present invention, the non-reading current-generating means is connected to the reading-side signal wire to which the reading-side coil is connected.

In the present invention, the magnetic head equipped with a writing core for writing magnetic data on the card and the writing-side coil wound around the writing core, for example, is a reading-writing integrated-type magnetic head; the non-reading current generating means is connected to a writing-side signal wire to which a writing-side coil is connected, and the amplitude of the wave of the non-reading current is smaller than that of the writing current which writes magnetic data on the card. It is preferred in this case that the non-reading current-generating means be a writing current-generating means that generates a writing current to the writing-side coil. With this configuration, there is no need to provide a non-reading current-generating means in addition to the writing current-generating means; therefore, the configuration of the card reader can be simplified.

In the present invention, it is preferred that the amplitude of the wave of the non-reading current be equal to that of the reading-current. With this configuration, if the non-reading current is generated to the reading-side coil outside the time when the magnetic data is being read, it will be more difficult (for the criminal) to distinguish between the reading current and the non-reading current. Therefore, this makes it more difficult for the criminal to acquire accurate magnetic information based on the reading current, effectively preventing the illegal acquisition of the magnetic information on the card.

In the present invention, it is preferred that the period of the wave of the non-reading current be the period determined by the recording density of the magnetic data recorded on the card and the moving speed of the card in the card reader. In this case, it is preferred that the period of the wave of the non-reading current vary irregularly within the range of the periods determined by the recording density of the magnetic data and the moving speed of the card in the card reader. With this configuration, when the non-reading current is generated to the reading-side coil outside the time when the magnetic data is being read, it is more difficult (for a criminal) to distinguish between the reading current and the non-reading current. Therefore, it will be even more difficult for the criminal to acquire accurate magnetic information based on the read current, thus effectively preventing the illegal acquisition of the magnetic information recorded on the card.

In the present invention, it is preferred that the intensity of the magnetic field generated by the magnetic head when the non-reading current is applied to the reading-side coil be weaker than the coercivity of the magnetic stripe formed on the card. With this configuration, even when the card makes contact with the magnetic head under the condition when the non-reading current is being applied to the reading-side coil, the magnetic data recorded on the magnetic stripe can be prevented from being destroyed by the influence of the non-reading current.

In the present invention, it is preferred that the card reader be equipped with a reading status-detecting means for detecting that the magnetic data is being read by the magnetic head and the non-reading current-generating means, based on the detection result from the reading-status detecting means, suspend the non-reading current which has been generated to the reading-side coil before the magnetic head starts reading the magnetic data and resume generating the non-reading current after the magnetic head finishes reading the magnetic data. In other words, it is preferred that, based on the detection result of the reading-status detecting means, the non-reading current be generated to the reading-side coil except for the period of time when the magnetic data is being read. With this configuration, it will be difficult for a criminal to distinguish between the reading current and the non-reading current. On the other hand, the reading current and the non-reading current can be properly distinguished in the card reader based on the detection result of the reading status-detecting means; therefore, the card reader can acquire the appropriate magnetic information.

In the present invention, it is preferred that the card reader be equipped with a circuit board on which the non-reading current-generating means is mounted and a non-reading current component-cancelling means be mounted on the circuit board for cancelling out the non-reading current component of the current applied to the reading-side coil. With this configuration, when the non-reading current is generated to the reading-side coil at the time of the magnetic data reading, the card reader can cancel out the component of the superimposed non-reading current to acquire accurate magnetic information based on the reading current. Also, with this configuration, when the non-reading current is generated to the reading-side coil except for the period of time when the magnetic data is being read or even when the non-reading current is constantly generated to the reading-side coil, since the component of the non-reading current is cancelled out by the non-reading current component-cancelling means, the card reader will not pick up any information except for the time when the magnetic data is being read, but can acquire accurate magnetic information based on the reading current at the time of the magnetic data reading. Note that, with this configuration, even if a criminal attaches a signal wire to the magnetic head, it is difficult for him to acquire accurate magnetic information that can be (normally) acquired based on the reading current.

In the present invention, it is preferred that the card reader be equipped with a reading status-detecting means for detecting that the magnetic head is performing the reading of the magnetic data and a circuit board on which the non-reading current-generating means is mounted, a non-reading current component-canceling means be mounted on the circuit board for canceling out the non-reading current component of the current applied to the reading-side coil, the non-reading current-generating means generate the non-reading current to the reading-side coil before the magnetic head starts reading the magnetic data and stop generating the non-reading current to the reading-side coil after the magnetic head finishes reading the magnetic data, based on the detection result of the reading status-detecting means. In other words, it is preferred that the non-reading current be generated to the reading-side coil at the time of the magnetic data reading, based on the detection result of the reading status-detecting means.

With this configuration, the non-reading current is superimposed on the reading current; therefore, even when a criminal attaches a signal wire to the magnetic head and acquires the waveform of the current flowing through the reading-side coil, accurate magnetic information based on the reading current cannot be acquired. On the other hand, the card reader can cancel out the component of the superimposed non-reading current and acquire accurate magnetic information based on the reading current. Also, when the card reader is configured in the manner, the current is not applied to the reading-side coil except for the period of time when the magnetic data is being read; therefore, the criminal is hardly aware that the card reader has a measure to prevent the illegal acquisition of the magnetic information. For this reason, the security of the card reader can be increased. Since, with this configuration, the current is not applied to the reading-side coil except for the period of time when the magnetic data is being read, energy can be saved on the card reader.

In the present invention, it is preferred that the card reader be equipped with a non-reading current detecting means for detecting that the non-reading current is generated to the reading-side coil. With this configuration, it is possible to detect a crime in which the connection between the non-reading current-generating means and the read-side signal wire is cut off, for example. Therefore, usage of the card reader is disabled based on the detection result of the non-reading current-detecting means so that the illegal acquisition of the magnetic information on the card is prevented with certainty. Also, with this configuration, the disconnection of the reading-side coil can be detected, for example. Therefore, the time for replacing the magnetic head can be detected based on the detection result of the non-reading current detecting means, improving the reliability of the card reader.

To achieve the above (another) objective, in a control method of a card reader equipped with a magnetic head which has a reading core for reading magnetic data recorded on a card and a reading-side coil wound around the reading core, a control method of a card reader of the present invention comprises a non-reading current-generating step which generates to the reading-side coil a non-reading current other than the reading current flowing through the reading-side coil when the magnetic data is being read even before a card is inserted to the card reader, a non-reading current-suspending step which suspends the non-reading current which has been generated to the reading-side coil before the magnetic head starts reading the magnetic data, and a non-reading current-regenerating step which resumes generating the non-reading current to the reading-side coil after the magnetic head finishes reading the magnetic data.

In the card reader control method of the present invention, the non-reading current is generated to the reading-side coil in the non-reading current-generating step even before a card is inserted to the card reader, the non-reading current that has been generated to the reading-side coil is suspended in the non-reading current-suspending step before the magnetic head starts reading the magnetic data, and the non-reading current is generated again to the reading-side coil in the non-reading current-regenerating step after the magnetic head finishes reading the magnetic data. For this reason, even if a criminal attaches a signal wire to the magnetic head and acquires the waveform of the current flowing through the reading-side coil, it will be difficult for the criminal to distinguish between the reading current and the non-reading current. Therefore, it is difficult for the criminal to acquire accurate magnetic information based on the reading current. Consequently the present invention can prevent the illegal acquisition of the magnetic information on the card.

The control method of the present invention can prevent the illegal acquisition of the magnetic information on the card without the demodulation circuit or encryption circuit being arranged in the magnetic head; therefore, the magnetic head can be minimized in size and the cost of the magnetic head can be reduced, compared to the card reader disclosed in JP 2002-189987. Therefore, in the present invention, the card reader can be minimized in size and manufactured at lower cost.

Further, to achieve the above (another) objective, in a control method of a card reader equipped with a magnetic head having a reading core for reading magnetic data recorded on cards and a reading-side coil wound around the reading core, a control method of a card reader of the present invention comprises a non-reading current-generating step which generates to the reading-side coil a non-reading current other than the reading current flowing through the reading-side coil when the magnetic data is being read before a card is inserted to the card reader, a non-reading current-halting step which stops generating the non-reading current to the reading-side coil before the magnetic head starts reading the magnetic data, and a non-reading current-regenerating step which resumes generating the non-reading current to the reading-side coil after the magnetic head finishes reading the magnetic data; in the non-reading current generating step, only the non-reading current component is canceled out of the current flowing through the reading-side coil at the circuit board of the card reader.

In the control method of a card reader of the present invention, the non-reading current-generating step starts generating the non-reading current before the magnetic head starts reading the magnetic data; the non-reading current-halting step stops generating the non-reading current to the reading-side coil after the magnetic head finishes reading the magnetic data. Therefore, even if a criminal attaches a signal wire to the magnetic head and acquires the waveform of the current flowing through the reading-side coil, since the non-reading current is superimposed on the reading current, it is difficult for the criminal to acquire accurate magnetic information which can (normally) be obtained based on the reading current. Consequently the present invention prevents the illegal acquisition of the magnetic information on the card.

Also, since the control method of the present invention makes it possible to prevent the illegal acquisition of the magnetic information on the card without the demodulation circuit or the encryption circuit being arranged in the magnetic head, the magnetic head can be minimized in size and the cost of the magnetic head can be reduced, compared to the card reader disclosed in JP 2002-189987. Therefore, in the present invention, the card reader can be minimized in size and manufactured at lower cost. Note that, in the present invention, only the non-reading current component is cancelled out of the current flowing through the reading-side coil at the circuit board of the card reader in the non-reading current-generating step; therefore, the card reader can acquire accurate magnetic information based on the reading current.

In the card reader of the present invention, a signal different from that of the magnetic information recorded on the magnetic stripe is output from the pre-head; therefore, the illegal acquisition of the magnetic information through the pre-head can be prevented.

Also, in the card reader of the present invention, the illegal acquisition of the magnetic information on the card can be prevented, and minimization of the size and cost reduction is possible. Further, by using the card reader control method of the present invention, the illegal acquisition of the magnetic information on the card can be prevented, and the card reader can be minimized in size and manufactured at lower cost.

BRIEF DESCRIPTION OF THE DRAWINGS

FIG. 8 shows a plan view to explain the configuration of a major portion of a card reader of the second embodiment of the present invention.

FIG. 9(A) is a plan view; FIG. 9(B) is a cross-sectional view taken along E-E line in (A).

FIG. 10(A) is a plan view; FIG. 10(B) is a side view.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

First Embodiment

Figure 1:
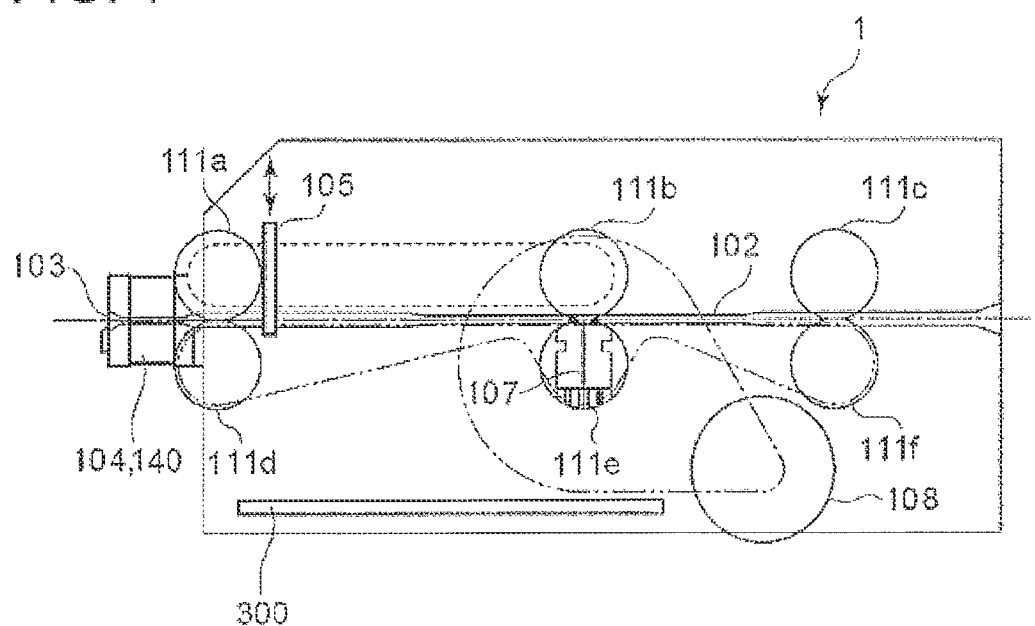
FIG. 1 shows a vertical cross-section of the structure of a card reader of the first embodiment of the present invention.
Figure 2:
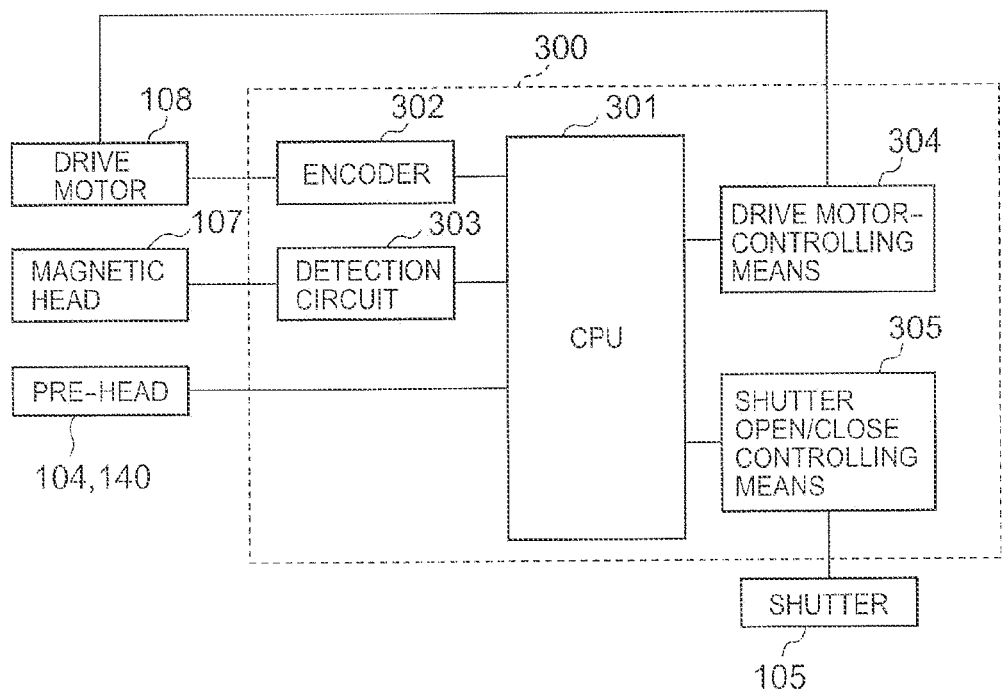
FIG. 2 shows a block diagram showing the electrical configuration of the card reader of the first embodiment of the present invention.

FIG. 1 is a vertical cross-section of the structure of a card reader 101 of the first embodiment of the present invention. FIG. 2 is a block diagram showing the electrical configuration of the card reader 101 of the first embodiment of the present invention.

In FIG. 1, the card reader 101 of the first embodiment of the present invention comprises a card insertion slot 103 for guiding magnetic cards to a transport passage 102, a pre-head for sending signals which are the sign to drive a drive motor 108 (described later) and sending signals which are the sign to open/close a shutter 105 to the transport passage 102, a magnetic head 107 for sending/receiving the magnetic data to/from the magnetic card when the inserted card is a magnetic card, a drive motor 108 for driving drive rollers 111d-111f via a transmitting belt or a drive shaft, driven rollers 111a-111c, respectively paired with the drive rollers 111d-111f, for holding the inserted cards, a circuit board 300, and other various mechanical components and electric components.

As shown in FIG. 2, mounted on the circuit board 300 are a CPU 301 which administers the drive control of each portion, an encoder 302, a detection circuit 303 which detects magnetic signals of the magnetic head 107, a drive motor controlling means 304, and a shutter close/open controlling means 305, etc.

The pre-head 104 is arranged near the card insertion slot 103 and at a position at which the magnetic stripe of the magnetic card passes; when a magnetic card is taken in from the card insertion slot 103, (the pre-head 104) detects the presence of a magnetic stripe on the card. Then, a signal which is a sign to drive the drive motor 108 is output to the circuit board 300 in the card reader 101. After recognizing the output signal from the pre-head 104, the CPU 301 sends a drive signal to the drive motor 108 via the drive motor controlling means 304 and takes the magnetic card inside; also, it sends an open signal to the shutter 105 via the shutter open/close controlling means 305 (operates an actuator, for example) to permit the card to be taken into the transport passage 102. Note that the encoder 302 is connected to the CPU 301 to detect the rotation of the drive motor 108 and control the card transporting. Although the pre-head 104 has the function to operate both the drive motor 108 and the shutter 105 in the first embodiment, it may have the function of only one of them.

The magnetic head 107 reads and writes magnetic data by making contact with/sliding against the magnetic stripe on the surface of the magnetic card. More specifically described, the magnetic head 107 is equipped with a head portion which has at least one pair of magnetic cores arranged to be opposite from each other having a magnetic gap (a gap spacer) between them and coils wound around a pair of the magnetic cores, and can read (reproduce) the magnetic information recorded on the magnetic stripe and write (record) new magnetic information on the magnetic card. For reading the magnetic information, a digital signal converted through the detection circuit 303 is input in the CPU 301. Note that the detection circuit 303 to be connected to the pre-head 104 is not necessary in the first embodiment, so it is omitted; however, it may be provided depending on necessity in the case that the structure of the pre-head 104 is changed as in "Modification Example of the First Embodiment" which will be described later.

In the first embodiment, the pre-head 104 is also equipped with a head portion in the same manner as the magnetic head 107. In other words, the pre-head 104 is equipped with at least one pair of magnetic cores arranged to be opposite from each other having a magnetic gap between them and coils wound around a pair of the magnetic cores. Both members may be configured the same to reduce cost by using common components.

Although not illustrated, the above-described head portion is stored in a metallic case used as a magnetic shield respectively in the pre-head 104 and the magnetic head 107 to detect the magnetic changes in the magnetic stripe on the magnetic card at the gap portion between the magnetic cores exposed to the surface of the case and output signals from the coils corresponding to the magnetic changes. Note that the output signals from the coils of the magnetic head 107 is input to a demodulating means (not illustrated) in the CPU 301. The demodulating means demodulates the card data recorded magnetically on the magnetic card from the output signal from the coils of the magnetic head 107.

Figure 3A:
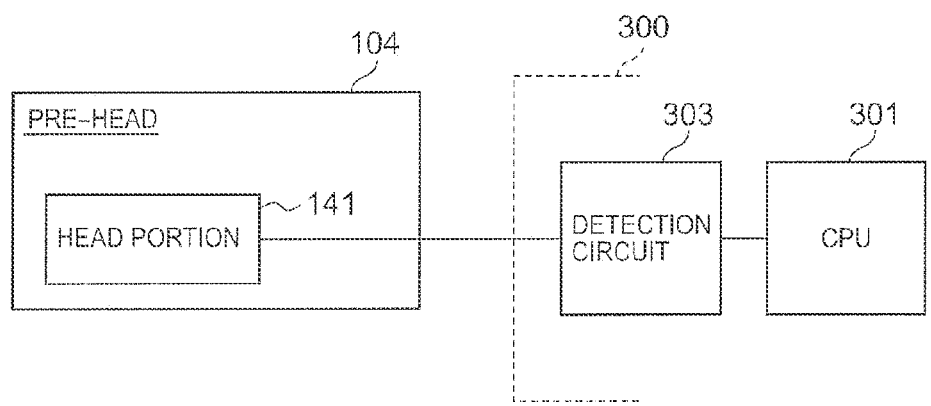
FIGS. 3A and 3B show block diagrams to explain the output signals from a pre-head.
Figure 3B:
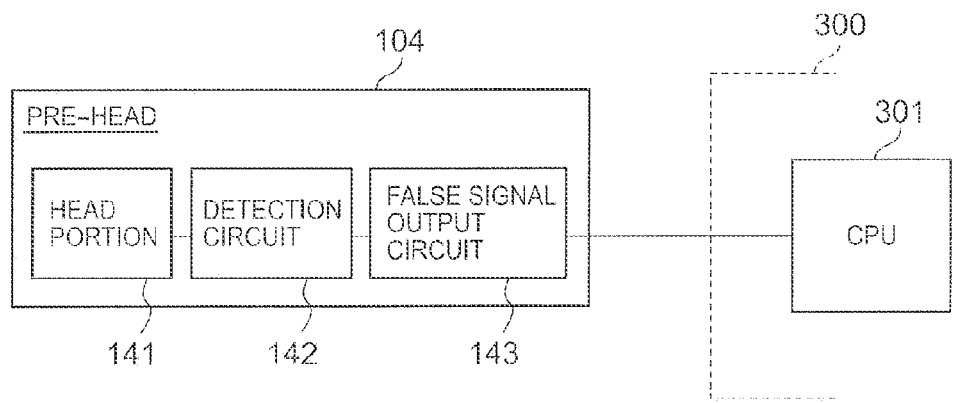

In the card reader 101 of the first embodiment, a signal different from that of the magnetic information recorded on the magnetic stripe is to be output from the pre-head 104. It is described more specifically referring to FIG. 3. FIG. 3 shows block diagrams used to explain the output signal from the pre-head 104. FIG. 3 (a) is a block diagram of a conventional card reader; FIG. 3 (b) is a block diagram of the card reader 101 of the first embodiment.

Figure 4:
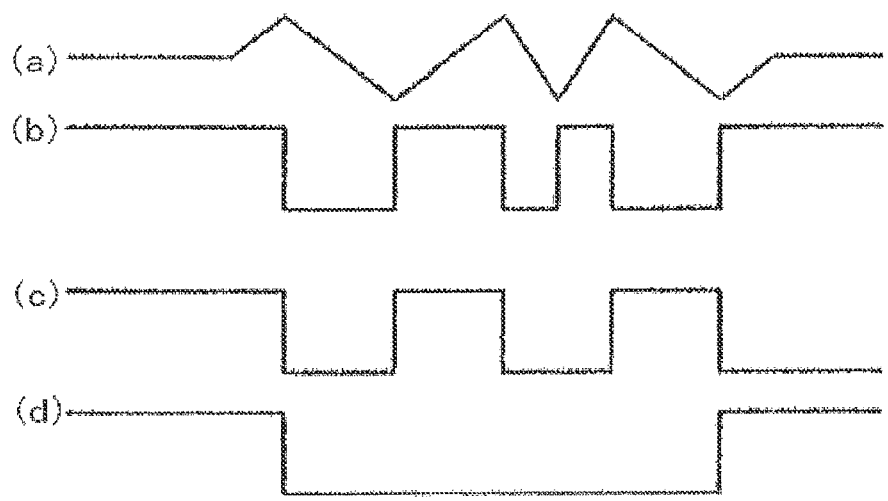
FIG. 4 shows a diagram showing specific examples of the output signals from the pre-head.

In a conventional card reader as shown in FIG. 3 (a), a digital signal from the pre-head 104 is input to the CPU 301 through the detection circuit 303 in the same manner as the magnetic head 107; therefore, the magnetic information itself recorded on the magnetic stripe has been sent between the head portion 141 of the pre-head 104 and the detection circuit 303 (the data shown in FIG. 4 (a), for example). After passing through the detection circuit 303, the above-mentioned digital signal (the data shown in FIG. 4 (d), for example) is input to the CPU 301.

However, if a card reader is configured in such a way, there is a risk that the magnetic information recorded in the magnetic stripe may be leaked (stolen) when a lead wire is illegally attached to a cable or the like that links the pre-head 104 and the detection circuit 303.

In the card reader 101 of the first embodiment, the above-described head portion is stored in a metallic case used as a magnetic shield in the pre-head 104 as described above; as shown in FIG. 3 (b), a detection circuit 142 for detecting the output signal from the head portion 141 and a pseudo-signal output circuit 143 for outputting a signal different from the output signal are arranged in the case of the pre-head 104. An example of the pseudo-signal output circuit 143 may be a pulse generator that generates periodic pulses, such as a multi vibrator and Schmitt Inverter Oscillator (the output shown in FIG. 4 (c), for example) or a logic circuit (the output shown in FIG. 4 (d), for example) that outputs a constant hold signal once it detects the signal input.

Also, the signal different from the signal of the magnetic information recorded on the magnetic stripe is output at the time the presence of the magnetic stripe is detected; however, other timing may be such that (the signal) is output after the shutter is moved. Further, the timing may be such that the signal is output the whole time or part of the time the pre-head 104 is in contact with/sliding against the magnetic stripe.

When the signal shown in FIG. 4 (c) or FIG. 4 (d), for example, is output from the pre-head 104 through the detection circuit 142 and the false signal output circuit 143, it is difficult to demodulate or decipher the signal since it is different from that of the magnetic information recorded on the magnetic stripe. Therefore, the leakage and illegal use of the magnetic information can be prevented.

Note that, although the detection circuit 142 may be one equivalent to a conventional detection circuit 303, it can be a circuit to which an omit (single noise removal) circuit or a detection sensitivity-modifying circuit is added. With this, noise immunity to the external noise can be increased. Also, by having the detection circuit 142 arranged in the pre-head 104, the circuit configuration of the circuit board 300 can be simplified. Thus, the above-described detection circuit 142 and the false signal output circuit 143 function as examples of the "signal converting means" which convert the output signal from the head portion 141 into a different signal.

In order to realize that a signal different from that of the magnetic information recorded on the magnetic stripe is output from the pre-head 104, the false signal output circuit or the like as the "signal converting means" is stored in the case of the pre-head 104, as described above, in the card reader 101 of the first embodiment; however, other methods may be used as the "signal converting means". That will be described in detail referring to FIG. 5 through FIG. 7.

Modification Example of First Embodiment

Figure 5:
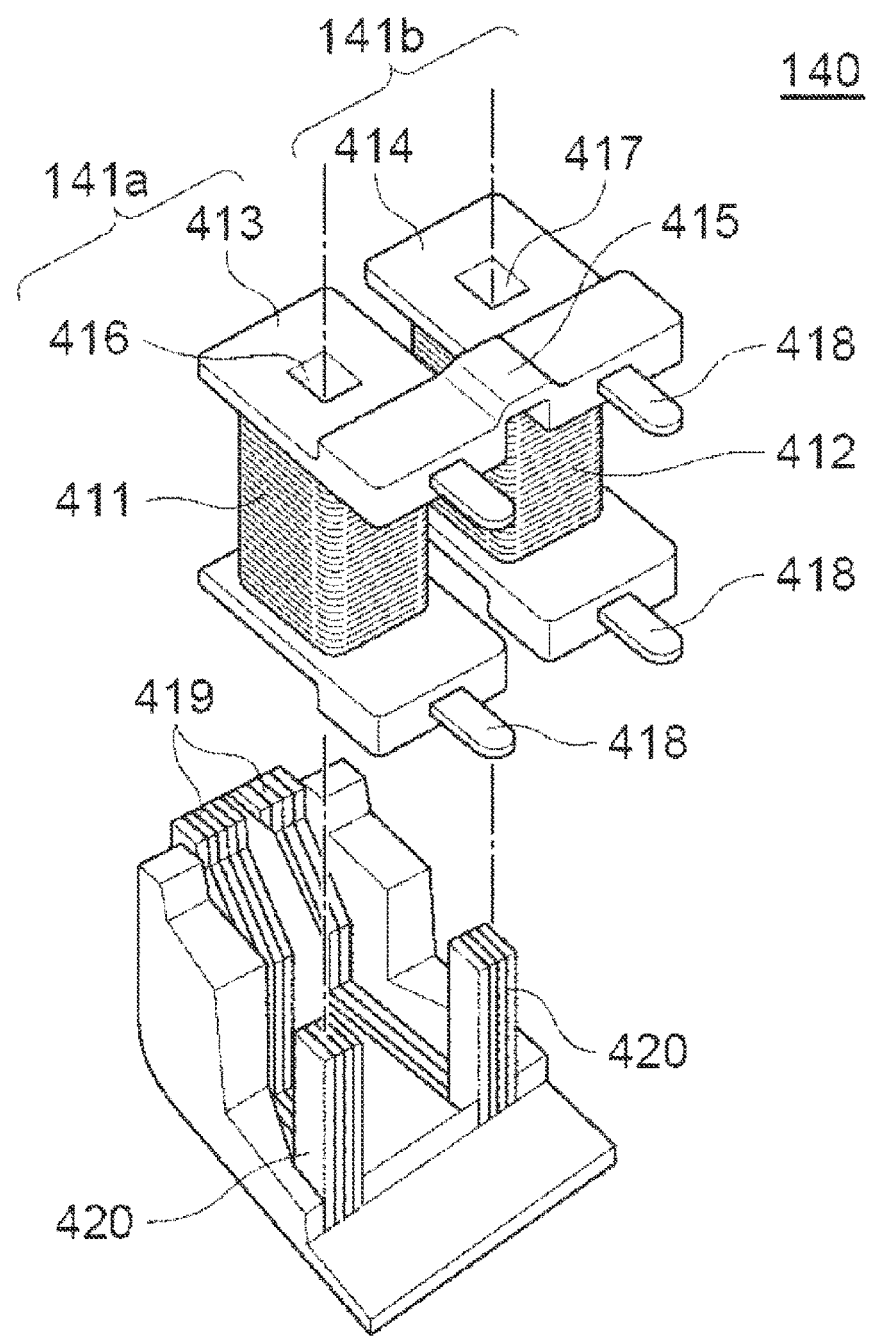
FIG. 5 shows a perspective view of the major mechanical structure of the pre-head.
Figure 6:
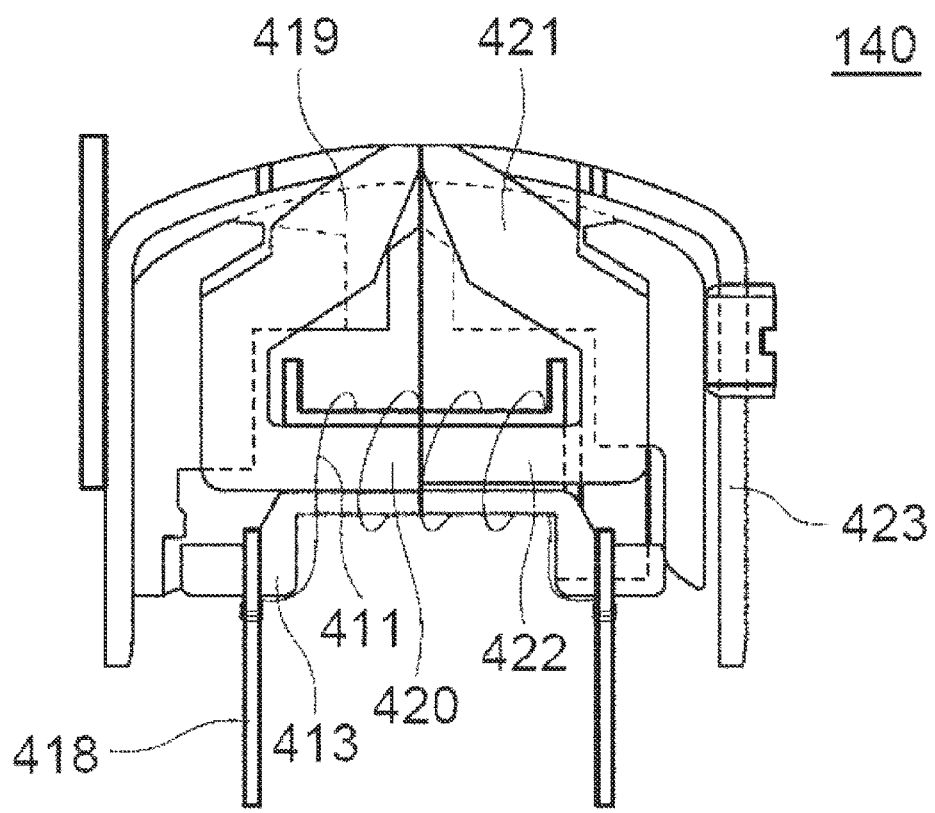
FIG. 6 shows a vertical cross-section of the major mechanical structure of the pre-head.

FIG. 5 is a perspective view of a major mechanical structure of a multi channel pre-head 140. FIG. 6 is a vertical cross-section of the major mechanical structure of the pre-head 140. Note that the pre-head 104 shown in FIG. 5 and FIG. 6 is a two-channel magnetic head in which the head portion 141 is provided in two parts corresponding to the two data tracks (the head portion 141a and the head portion 141b). Note that, in the first embodiment, it was the head portion which has at least one pair of magnetic cores arranged to be opposite from each other with a magnetic gap (gap spacer) between them and coils wound around a pair of the magnetic cores, and was described including one channel magnetic head; however, this multi channel pre-head has two or more channels and is coded as pre-head 140.

In FIG. 5 and FIG. 6, two bobbins 413, 414 around which the coils 411, 412 are respectively wound are formed of resin and integrally linked with each other via a link portion 415 between the bobbins 413 and 414. In the center of the bobbin 413, 414, a center hole 416, 417 is respectively formed so as to pass through in the top-bottom direction. Further, terminal strips 418 are projected at the top and bottom end portions of the bobbins 413, 414.

The bobbins 413, 414 around which the coils 414, 412 are wound in the above manner are simultaneously inserted to winding core portions 420 of the magnetic core 419. Then, as shown in FIG. 6, the winding core portion 422 of the magnetic core 421 which configures the half of the top portion are inserted to the center holes 416, 417 of the bobbins 413, 414. Further, while both magnetic cores 419 and 421 are arranged to be opposite from each other having a spacer (gap) of a several micron thickness (not illustrated) interposed between them, they are fitted to a magnetic shield metallic case 423. Then, as a predetermined amount of resin is filled inside the shield case, the two-channel magnetic head (pre-head 140) is completed.

Figure 7:
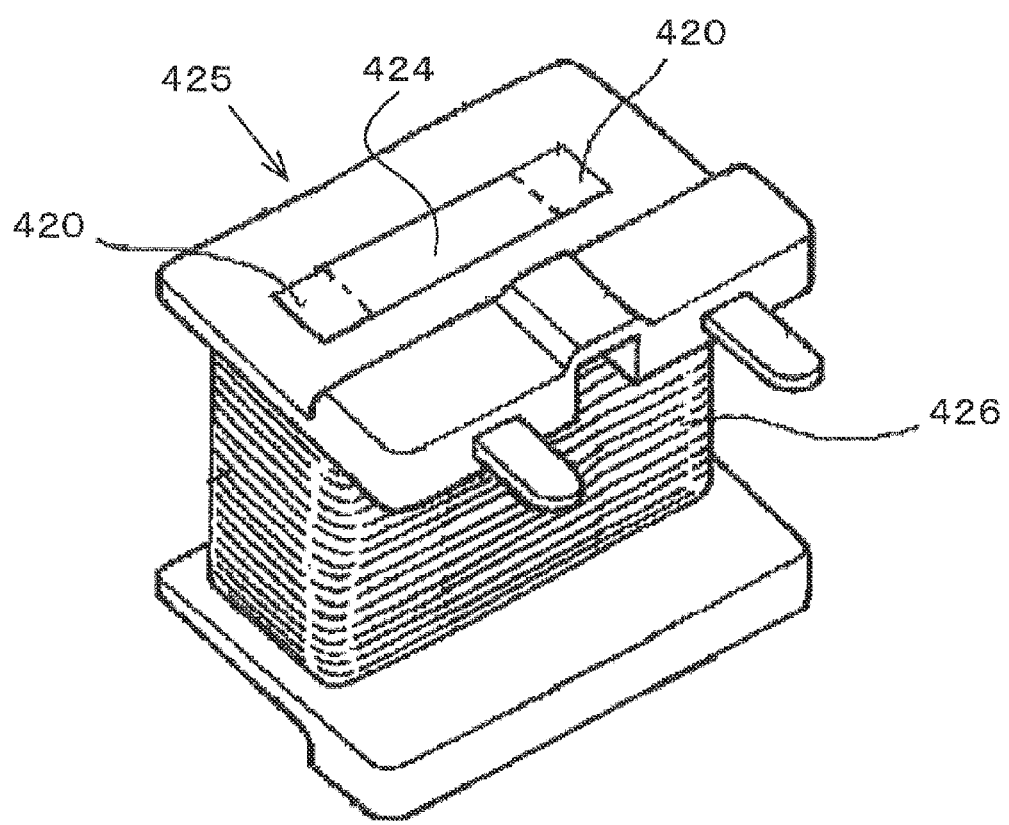
FIG. 7 shows a vertical cross-section to explain a major mechanical structure of a pre-head of the modification example 1 of the first embodiment of the present invention.

Since the bobbins 413, 414 are provided for the coils 411, 412 respectively in the pre-head 140 shown in FIG. 5 and FIG. 6, the magnetic information recorded on the magnetic stripe can be obtained from the two head portions 141a and 141b corresponding to the two data tracks, causing a risk that the magnetic information may be leaked (stolen) or illegally used. As shown in FIG. 7, then, the integration of the bobbins 413, 414 is considered; more specifically, a common bobbin around which a coil is wound is provided.

Used in the pre-head 140 shown in FIG. 7 is a single bobbin 425 having a center hole 424 to which two winding core portions 420 (the winding core portion 420 of the magnetic core 419 and the winding core portion 420 of the magnetic core 421) are inserted. More precisely, the common bobbin 425 having the coil 426 wound around is fitted to the two magnetic cores 419, 421. Since the signal obtained from the magnetic core 419 and the signal obtained from the magnetic core 421 are synthesized in this configuration, the data (the signals) cannot be separately or obtained independently. Consequently, the leakage or illegal use of the magnetic information can be prevented. Note that the pre-head 140 is sufficient as long as it has the function of detecting the presence of the magnetic stripe and even the bobbin 425 can play the role of operating the drive motor 108 or the shutter 105.

Note that, in this embodiment, a detection circuit may be arranged in the pre-head 140, as in FIG. 4 (b) (compare to FIG. 3 (b)), or a detection circuit may be arranged on the circuit board as in FIG. 4 (a) (compare to FIG. 3 (a)), in the same manner as the first embodiment.

Major Effects of First Embodiment:

As described above, the detection circuit 142 and the false signal output circuit 143 described in the first embodiment or the common bobbin 425 described in the modification example of the first embodiment are used as the signal converting means. In this way, a signal different from that of the magnetic information recorded on the magnetic stripe is output, preventing leakage or illegal usage of the magnetic information.

Note that, although the false signal output circuit 143 and the common bobbin 425 are separately described as the signal converting means in this specification, it is needless to say that the pre-head 104, 140 having both members may be considered for use. Also, the detection circuit 142 and the false signal output circuit 143 described as the signal converting means in the first embodiment may be stored in the shield case 423 that covers one pair of the magnetic cores 419, 421 and the coil 426. By configuring (the card reader) in this way, although a lead wire or the like is attached to the pre-head 104, the leakage of the magnetic information can be prevented.

Since a signal different from that of the magnetic information recorded on the magnetic stripe is output from the pre-head 104, it is difficult to replace the pre-head 104 with another counterfeit product during the card reader 101 maintenance. In other words, the conventional pre-head 104 (see FIG. 3 (*a*)) performs an analogue output from the head portion 141; therefore, it can be replaced with another counterfeit product. In contrast, the pre-head 104 (see FIG. 3 (*b*)) in the first embodiment outputs a digital signal through the detection circuit 142 and the false signal output circuit 143; therefore, it cannot be replaced with a counterfeit product which performs analogue output, and as a result, it is difficult to replace it with a counterfeit product. Thus, security can be increased against replacement with a counterfeit product.

Also, when the common bobbin 425 is used, the number of the bobbins can be reduced from two which is a conventional number (the bobbins 413, 414 shown in FIG. 5 and FIG. 6) to one (the bobbin 425 shown in FIG. 7) in the first embodiment, and the winding of the coil can be one as well (the coil 426 in FIG. 7); therefore, the manufacturing cost can be reduced.

Note that, although a two-channel magnetic head is used in the embodiment shown in FIG. 5 through FIG. 7, a three-channel magnetic head can be used as well.

The second embodiment of the present invention is described hereinafter referring to the drawings.

Second Embodiment

Configuration of Card Reader

FIG. 8 is a plan view to explain the configuration of a major portion of a card reader 1 of the second embodiment of the present invention.

A card reader 1 of the second embodiment is a device for reading magnetic data recorded on a card 2 and writing magnetic data on the card 2. This card reader 1 is equipped with, as shown in FIG. 8, a card processing portion 3 for reading magnetic data recorded on the card 2 and writing magnetic data on the card 2 and a card inserting portion 5 at which a card insertion slot 4 is formed for the card be inserted and discharged. Formed inside the card reader 1 is a card transport passage 6 on which the card 2 inserted from the card insertion slot 4 is transported.

In the second embodiment, the card 2 is transported in the X direction (the left-right direction) of FIG. 8. In other words, the X direction is the transporting direction of the card 2. Also, the Z direction (the direction perpendicular to the page) in FIG. 8 is the thickness direction of the card 2; the Y direction (the top-bottom direction) of FIG. 8 orthogonal to the X direction and the Z direction is the width direction (the lateral width direction) of the card 2.

The card 2 is a rectangular vinyl chloride card having a thickness of 0.7 to 0.8 mm. On the card 2, a magnetic stripe 2*a* is formed. Note that an IC chip may be fixed on the card 2 or a communication antenna may be built into the card. Also, the card 2 may be a PET (polyethylene terephthalate) card having a thickness of about 0.18 to 0.36 mm or may be a paper card having a predetermined thickness.

The card processing portion 3 is provided with a card transporting mechanism 8 for transporting the card 2 in the card transport passage 6, a magnetic head 9 for reading and writing magnetic data, and a photo sensor 10 for detecting the presence of the card 2 in the card transport passage 6.

The card transporting mechanism 8 is equipped with three transport rollers 11, a drive motor 12 for turning the transport rollers 11, and a power transmitting mechanism 13 for transmitting the power of the drive motor 12 to the transport rollers 11. Also, the card transporting mechanism 8 is provided with pad rollers (illustration omitted) arranged to face the transport rollers 11 and urged toward the transport rollers 11. The three transport rollers 11 are arranged at a predetermined interval in the transporting direction of the card 2.

The magnetic head 9, as shown in FIG. 8, is arranged such that the rotation center of the transport roller 11 arranged in the middle of the card processing portion 3 and the center of the magnetic head 9 align with each other in the X direction. Also, an opposing roller 14 is arranged to face the magnetic head 9 to apply an urging force to the card 2 passing in the card transport passage 6 toward the magnetic head 9. The detailed configuration of the magnetic head 9 is described later.

The photo sensor 10 is an optical sensor having a light-emitting device and a light-receiving device. The photo sensor 10, as shown in FIG. 8, is arranged such that the center of the magnetic head 9 aligns with the center of the photo sensor 10 in the X direction. In this embodiment, the magnetic head 9 reads the magnetic data recorded in the magnetic stripe 2*a* immediately after the front end of the card 2 is detected by the photo sensor 10, and completes the reading of the magnetic data right before the card 2 is no longer detected by the photo sensor 10. In other words, in the second embodiment, it is possible to detect whether or not the magnetic head 9 is performing the reading of the magnetic data.

The card insertion section 5 is provided with a card insertion detecting mechanism 15 for detecting whether or not the card 2 is inserted at the card insertion slot 4, a shutter member 16 for opening/closing the card transport passage 6, and a pre-head (magnetic head) 17 for reading magnetic data recorded on the magnetic stripe 2*a*.

The card insertion detecting mechanism 15 is provided with a sensor lever 20 capable of making contact with one of the end portions of the card in the width direction and a card width sensor 21 for detecting whether the sensor lever 20 is in contact with the card 2.

The sensor lever 20 is capable of turning about a predetermined rotation axis and capable of coming into the card transporting passage 6. The card width sensor 21 is a contact switch equipped with a lever member and contacts that are pressed by the lever member. In the second embodiment, when the end portion of the card 2 in the width direction, which is inserted from the card insertion slot 4, makes contact with the sensor lever 20, the sensor lever 20 turns and makes contact with the lever member of the card width sensor 21, and the contacts are pressed by the lever member. In other words, the card width sensor 21 of the second embodiment detects that the card 2 is inserted from the card insertion slot 4 by detecting that the card 2 inserted from the card insertion slot 4 contacts the sensor lever 20.

Note that the card width sensor 21 may be an optical sensor having a light-emitting device and a light-receiving device. Also, the card insertion-detecting mechanism 15 may be a mechanical detecting mechanism having contacts that directly make contact with the end portion of the card 2 in the width direction.

The pre-head 17 is arranged in the vicinity of the card insertion slot 4 in the transporting direction of the card 2. More specifically described, the pre-head 17 is arranged in the vicinity of the contact portion of the sensor lever 20 with the card 2. In the second embodiment, the pre-head 17 starts reading the magnetic data recorded in the magnetic stripe 2a immediately after the front end of the card 2 is detected by the card insertion-detecting mechanism 15, and finishes reading the magnetic data right before the card 2 is no longer detected by the card insertion-detecting mechanism 15. In other words, in the second embodiment, it is possible to detect with the card insertion detecting mechanism 15 whether or not the pre-head 17 is performing the reading of the magnetic data. The card insertion-detecting mechanism 15 of the second embodiment is a reading status-detecting means which detects that the pre-head 17 is performing the reading of the magnetic data. The detailed configuration of the pre-head 17 is described later.

Figure 9A:
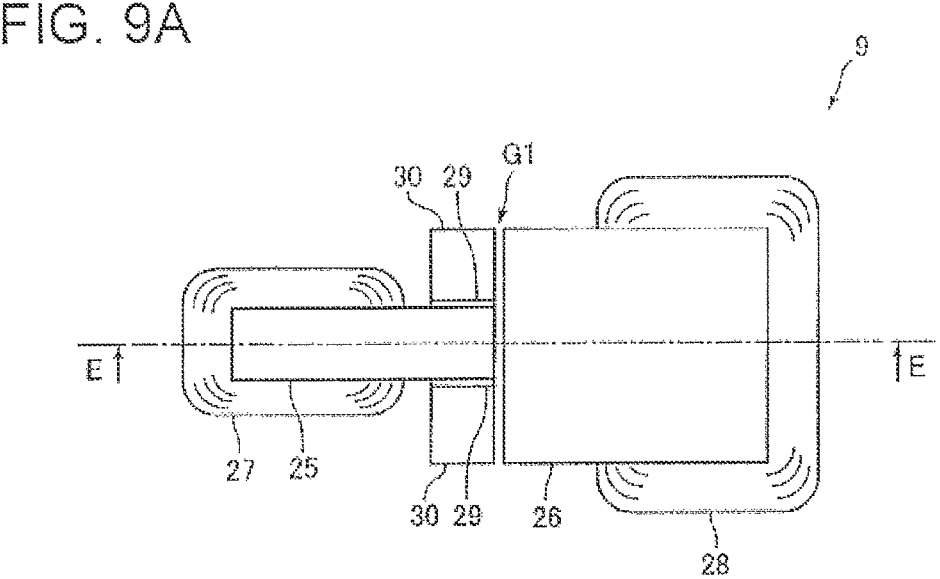
FIGS. 9A and 9B show diagrams to explain the configuration of the inside the magnetic head shown in FIG. 8.
Figure 9B:
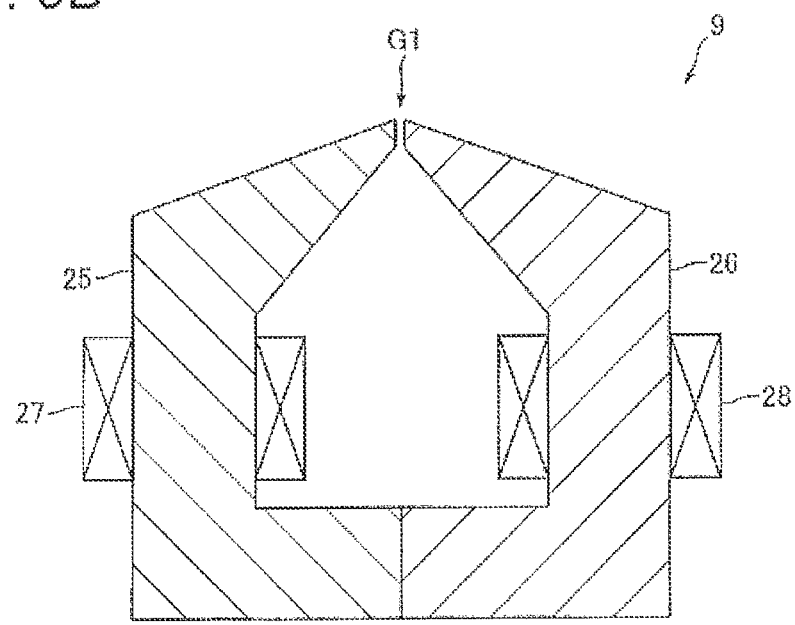
Figure 10A:
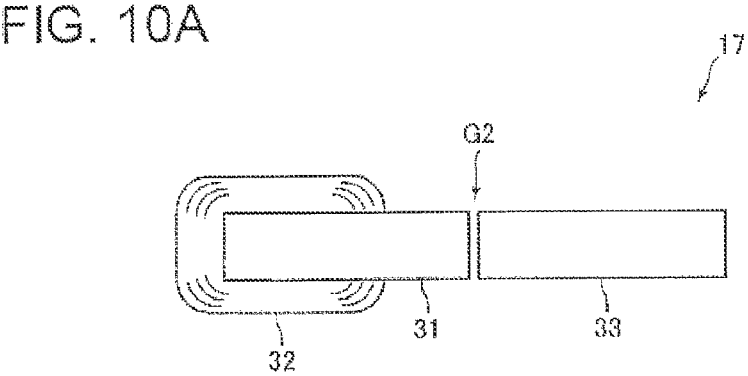
FIGS. 10A and 10B show diagrams to explain the configuration of the inside of the pre-head shown in FIG. 8.
Figure 10B:
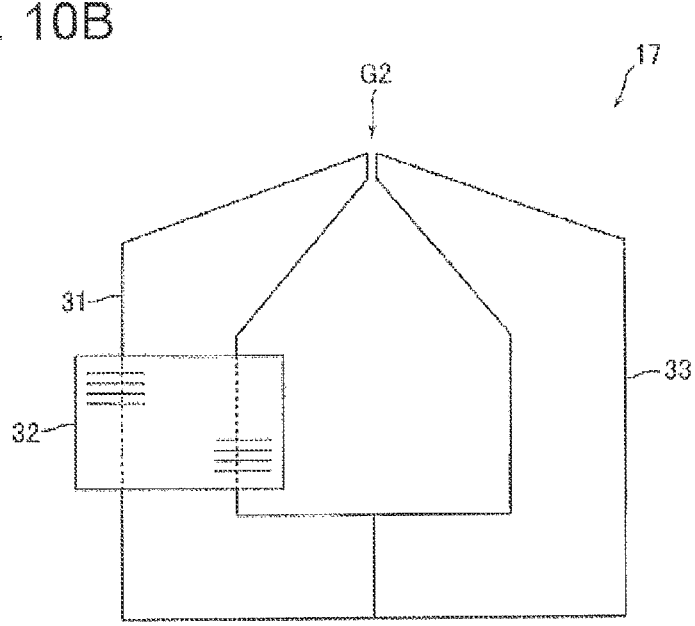

Configuration of Magnetic Head and Pre-Head:

FIG. 9 shows diagrams to explain the configuration of the inside of the magnetic head 9 shown in FIG. 8: (A) is a plan view; (B) is a cross section of (A) taken along the E-E line. FIG. 10 shows diagrams to explain the configuration of the inside of the pre-head 17 shown in FIG. 8: (A) is a plan view; (B) is a side view.

The magnetic head 9, as shown in FIG. 9, is equipped with a reading core 25 for reading magnetic data recorded in the magnetic stripe 2a, a writing core 26 for writing magnetic data on the magnetic stripe 2a, a reading-side coil 27 wound around the reading core 25 and a writing-side coil 28 wound around the writing core 26. Also, the magnetic head 9 is equipped with dummy cores 30 arranged at both ends of the reading core 25 in the top-bottom direction of FIG. 9 (A) via spacers 29. The reading core 25, the writing core 26, the reading-side coil 27, the writing-side coil 28 and the dummy cores 30 are stored in the case which is not shown in the drawing.

The magnetic head 9 of the second embodiment is a reading-writing integrated magnetic head in which the reading core 25 and the writing core 26 are integrated, and a gap G1 is created at the front end of the magnetic head (the top end in Fig. (B)). Note that in the second embodiment, the magnetic data written in three tracks can be recorded in the magnetic stripe 2a; the magnetic head 9 is actually equipped with three sets of reading cores 25, writing cores 26, reading-side coils 27, writing-side coils 28 and dummy cores 30.

The pre-head 17, as shown in FIG. 10, is provided with a reading core 31 for reading magnetic data recorded in the magnetic stripe 2a and a reading-side coil 32 wound around the reading core 31. The pre-head 17 is also equipped with a dummy core 33. The reading core 31, the reading-side coil 32 and the dummy core 33 are stored in a case which is not shown in the drawing. Also, a gap G2 is created at the front end (the top end in FIG. 10 (B)) of the pre-head 17. Note that the pre-head 17 of this embodiment can read the magnetic data recorded in two out of the three tracks; the pre-head 17 actually is provided with two sets of reading cores 31, reading-side coils 32 and dummy cores 33.

Figure 11:
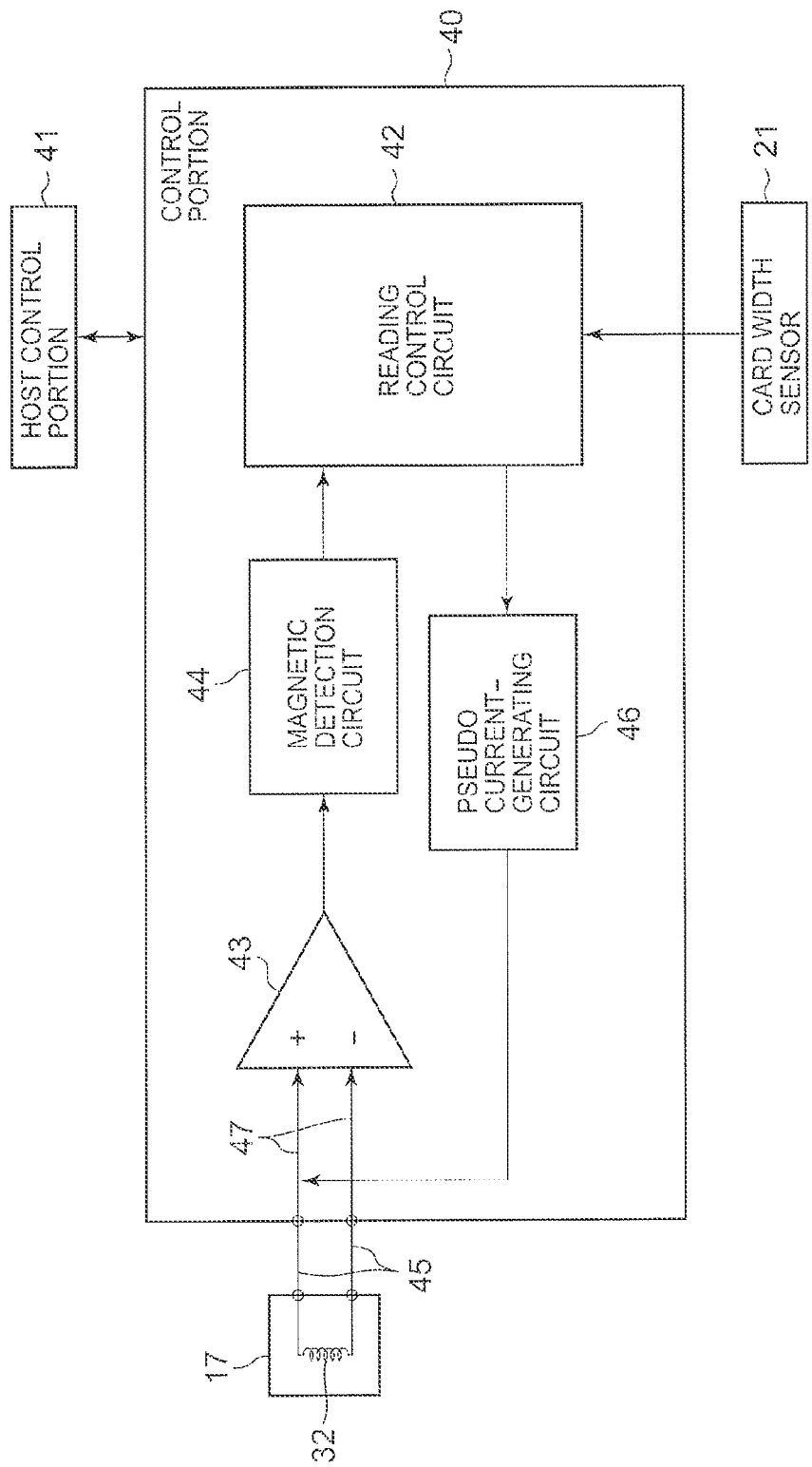
FIG. 11 shows a block diagram showing the configuration of the control portion and its related portions of the card reader shown in FIG. 8.
Figure 12:
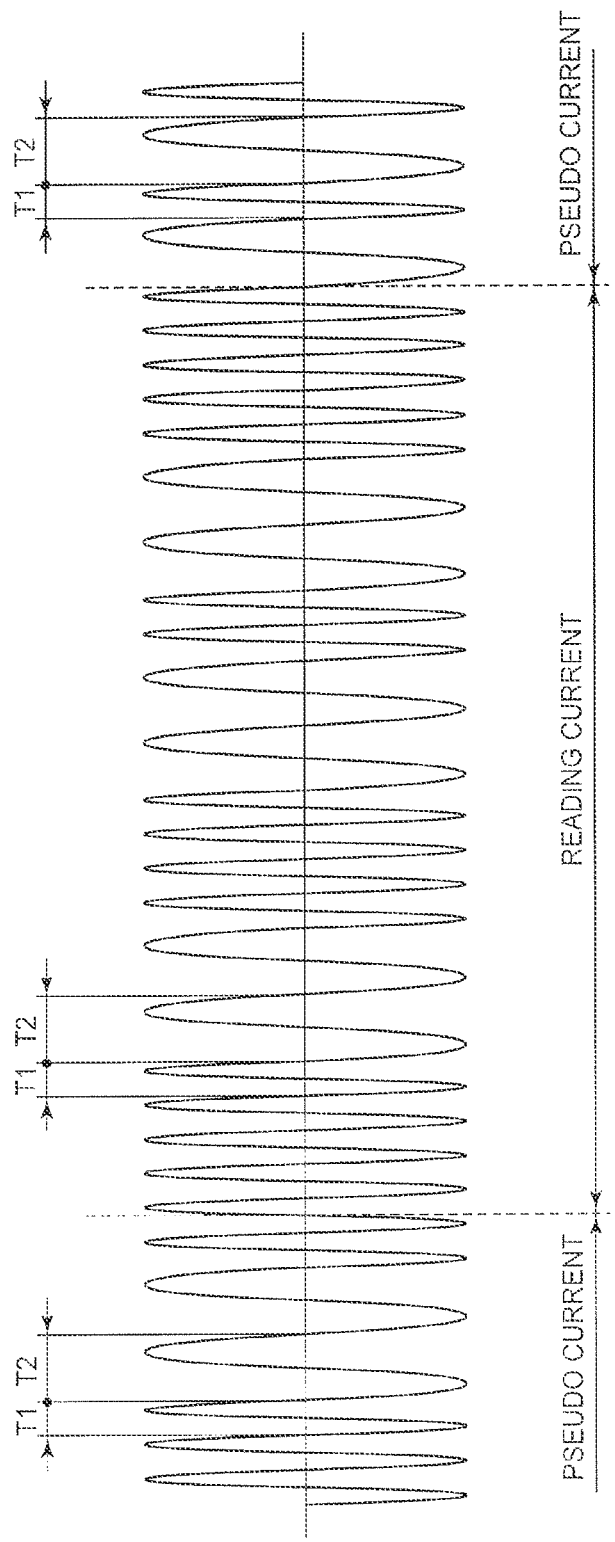
FIG. 12 shows a diagram of an example of the waveform of the current flowing through the pre-head shown in FIG. 8.

Configuration of Control Portion of Card Reader:

FIG. 11 is a block diagram showing the configuration of a control portion 40 and its related portions of the card reader 1 of FIG. 8. FIG. 12 is a diagram of an example of a waveform of the current flowing through the pre-head 17 shown in FIG. 8. Note that FIG. 11 shows only the configuration of the control portion 40 related to the control of the pre-head 7.

All the configurations of the control portion 40 that perform various controls of the card reader 1 are mounted on a circuit board (illustration omitted). In other words, a reading-control circuit 42, an amplifier circuit 43, a magnetic detection circuit 44 and a pseudo current-generating circuit 46 which are to be described hereinafter are mounted on the circuit board. Also, connected to the control portion 40 is a host control portion 41 which controls a host device such as an ATM in which the card reader 1 is installed.

The control portion 40 is provided with the reading control circuit 42 which is a constituent of the control of the pre-head 17. The reading control circuit 42 is a CPU, for example. The reading-side coil 32 of the pre-head 17 is connected to the reading control circuit 42 via the amplifier circuit 43 and the magnetic detection circuit 44. In other words, the current flowing through the reading-side coil 32 is amplified at the amplifier circuit 43 and input to the reading-control circuit 42 via the magnetic detection circuit 44. Also, a card width sensor 21 is connected to the reading-control circuit 42. Note that the reading-side coil 32 of the pre-head 17 and the circuit board are connected by flexible printed circuits (FPC) or a connection cable 45 such as a lead wire. Also, the amplifier circuit 43 is, for example, an operational amplifier, and both ends of the reading-side coil 32 are connected respectively to a non-inverting input terminal and to an inverting input terminal of the amplifier circuit 43.

The control portion 40 is also provided with a pseudo current generating circuit 46 which is a constituent of the control of the pre-head 17 for generating a pseudo current resembling the reading current flowing through the reading-side coil 32 when the magnetic data recorded on the card 2 is being read. The pseudo current of the second embodiment is a non-reading current other than the reading current, and the pseudo current-generating circuit 46 is a non-reading current-generating means for generating a pseudo current which is a non-reading current.

The pseudo current-generating circuit 46 is connected to the reading control circuit 42, and a control signal of the reading control circuit 42 is input to the pseudo current-generating circuit 46. Also, the pseudo current-generating circuit 46 is connected to one side of the circuit pattern linking the connection cable 45 with the amplifier circuit 43, and outputs signals toward the one side of the circuit pattern 47. When the pseudo current-generating circuit 46 outputs signals toward the one side of the circuit patterns 47, a pseudo current is generated to the reading-side coil 32. Note that, although the circuit pattern 47 is formed on the circuit board and the pseudo current-generating circuit 46 is connected to the one side of the circuit pattern 47 in this embodiment, the pseudo current-generating circuit 46 may be connected to the connection cable 45 via a predetermined connection cable. The connection cable 45 and the circuit pattern 47 of the second embodiment are the reading-side signal wires to which the reading-side coil 32 is connected.

In the second embodiment, the pseudo current-generating circuit 46 generates a pseudo current to the reading-side coil 32 except for the period of time when the pre-head 17 is reading the magnetic data on the card 2 (in other words, except for the period of time when the reading current is being applied to the reading-side coil 32), as shown in FIG. 12. Note that, in FIG. 12, the vertical axis indicates the size (amplitude) of the wave of the current flowing through the reading-side coil 32, and the horizontal axis indicates time.

In the second embodiment, as shown in FIG. 12, the pseudo current-generating circuit 46 generates to the reading-side coil 32 a pseudo current composed of the wave having an amplitude equal to the amplitude of the wave of the reading current (that is, the current flowing through the reading-side coil 32 during the time of the magnetic data reading). In other words, the amplitude of the wave of the pseudo current is equal to the amplitude of the wave of the reading current.

Here, the amplitude of the reading current of the pre-head 17 is much smaller than that of the writing current flowing through the writing-side coil 28 when the magnetic head 9 is recording magnetic data on the card 2. In other words, the reading current is much smaller than the writing current, and the pseudo current is much smaller than the writing current. For instance, the amplitude of the pseudo current is about one thousandth of the amplitude of the writing current. Therefore, in this embodiment, the intensity of the magnetic field which is produced by the pre-head 17 when the pseudo current is applied to the reading-side coil 32 is very weak, compared to the coercivity of the magnetic stripe 2a.

Also, in the second embodiment, the pseudo current-generating circuit 46 generates to the reading-side coil 32 a pseudo current composed of the wave having a period corresponding to the recording density of the magnetic data recorded on the card 2. In other words, the period of the wave of the pseudo current is the period corresponding to the recording density of the magnetic current. More specifically described, the period of the wave of the pseudo current is the period determined by the recording density of the magnetic data and the transporting speed of the card 2 (that is, the moving speed of the card 2 inside the card reader 1).

When the recording method of magnetic data is of an F2F method, for instance, the pseudo current-generating circuit 46, as shown in FIG. 12, generates to the reading-side coil 32 a pseudo current composed of a combination of the wave having the period T1 determined by the recording density of the magnetic data and the transporting speed of the card 2 and the wave having the period T2, which is twice as big as the period T1. Also, as shown in FIG. 12, the pseudo current-generating circuit 46 generates to the reading-side coil 32 a pseudo current in which the period varies irregularly within the range of the periods determined by the recording density of the magnetic data and the transporting speed of the card 2. In other words, the pseudo current-generating circuit 46 generates to the reading-side coil 32 a pseudo current in which the period thereof irregularly varies between the period T1 and the period T2.

Figure 13:
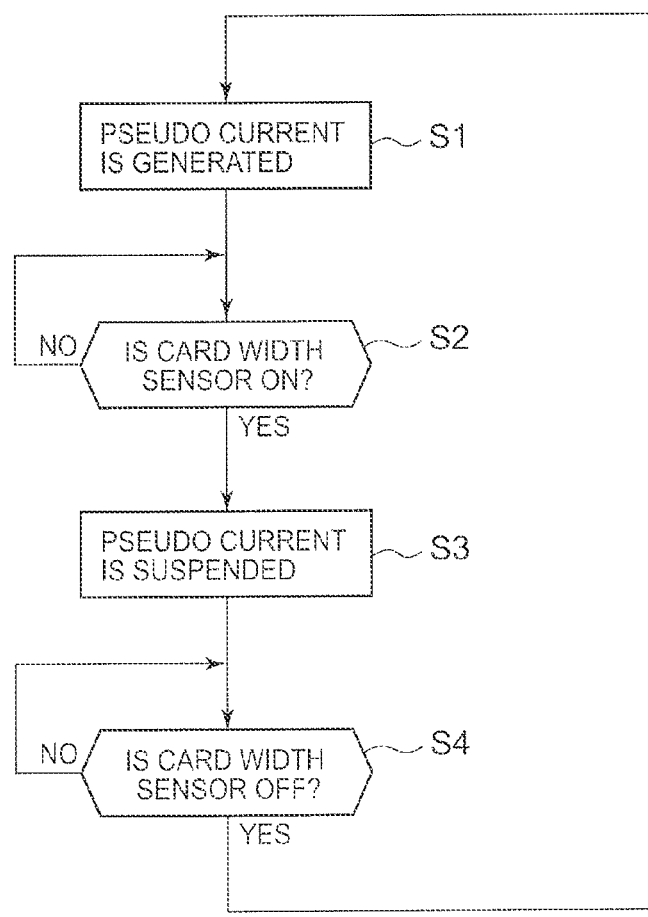
FIG. 13 shows a flowchart of an example of the control of the pre-head shown in FIG. 8.

Control of Pre-Head:

FIG. 13 is a flowchart showing an example of the control of the pre-head 17 shown in FIG. 8.

In the card reader 1 of the second embodiment, the pre-head 17 is controlled as described below, for example. In other words, as described above, the control portion 40 (more specifically, the pseudo current-generating circuit 46) generates a pseudo current to the reading-side coil 32 except for the period of time the magnetic data recorded on the card 2 is being read (that is, except for the period of time when the reading current is being applied to the reading-side coil 32); even when the card reader 1 is in a stand-by status where a card 2 is not inserted, the pseudo current is being generated to the reading-side coil 32 (Step S1).

Under this condition, the control portion 40 judges whether or not the card width sensor 21 is turned on (Step S2). In other words, the control portion 40 judges based on the output signal from the card width sensor 21 whether or not a card 2 is inserted from the card insertion slot 4. When the card 2 is inserted from the card insertion slot 4 and the card width sensor 21 is turned on (that is, "Yes" in Step 2), the pre-head 17 immediately starts reading the magnetic data recorded in the magnetic stripe 2a; therefore, the control portion 40 (more specifically, the pseudo current-generating circuit 46) suspends the pseudo current which has been generated to the reading-side coil 32.

Under this condition, the control portion 40 judges whether or not the card width sensor 21 is turned off (Step S4). In other words, the control portion 40 judges based on the output signal from the card width sensor 21 whether or not the rear end of the card 2 has passed the sensor lever 20. When the rear end of the card 2 passes the sensor lever 20 and the card width sensor 21 is turned off (that is, "Yes" in Step S4), the process returns to Step S1 since the pre-head 17 has finished reading the magnetic data right before the sensor 21 is turned off, and the control portion 40 starts generating the pseudo current to the reading-side coil 32.

In this manner, the pseudo current which has been generated to the reading-side coil 32 is suspended right before the pre-head 17 starts reading the magnetic data, based on the detection result of the card width sensor 21 (that is, based on the detection result of the card insertion-detecting mechanism 15) in the second embodiment. Also, based on the detection result of the card width sensor 21, the pseudo current is generated to the reading-side coil immediately after the pre-head 17 finishes reading the magnetic data. Therefore, the current as shown in FIG. 5 (FIG. 12) is applied to the reading-side coil 32. Note that the reading control circuit 42 demodulates the magnetic data based on the signal which has been input during the time from On to Off of the card width sensor 21. Therefore, in the card reader 1 accurate magnetic information can be obtained even though the pseudo current is generated to the reading-side coil 32 outside the period of time of the magnetic data reading.

The reading control circuit 42 and the magnetic detection circuit 44 constantly oversee whether or not the pseudo current is being generated to the reading-side coil 32 in Step S1. When the pseudo current is not generated to the reading-side coil 32 in Step S1, a crime has likely been committed in that the connection between the pseudo current-generating circuit 46 and the circuit pattern 47 is cut off, for example. Therefore, when it is detected that the pseudo current is not generated to the reading-side coil 32 in Step S1, the control portion 40 turns the card reader 1 to the status to prohibit the card 2 from being inserted. In this case, the control portion 40 outputs a signal to the host controller 41 to notify it that there is something abnormal, and then the host controller 41 generates an alarm to the host device. Generating an alarm notifies and prompts a user of the necessity of inspection. The reading control circuit 42 and the magnetic detection circuit 44 of this embodiment are the non-reading current detection means for detecting that the pseudo current which is a non-reading current is generated to the reading-side coil 32.

Note that, in the second embodiment, Step S1 is a non-reading current-generating step which generates the pseudo current as a non-reading current to the reading-side coil 32 even before the card 2 is inserted to the card reader 1. Also, Step S3 is a non-reading current-suspending step which suspends the pseudo current which has been generated to the reading-side coil 32 before the pre-head 17 starts reading the magnetic data. Further, Step S1 which has been returned after Step S4 is a non-reading current-regenerating step which resumes generating a pseudo current to the reading-side coil 32 after the pre-head 17 finishes reading the magnetic data.

Major Effects of Second Embodiment:

As described above, the card reader 1 of the second embodiment is equipped with the pseudo current-generating circuit 46 to generate a pseudo current to the reading-side coil 32. Also, in the second embodiment, based on the detection result from the card insertion detecting mechanism 15, the pseudo current which has been generated to the reading-side coil 32 is suspended right before the pre-head 17 starts reading the magnetic data, and the pseudo current is generated to the reading-side coil 32 immediately after the pre-head 17 finishes reading the magnetic data. In other words, in the second embodiment, the pseudo current is generated to the reading-side coil 32 continuously except for the period of time when the pre-head 17 is reading the magnetic data.

Therefore, the current as shown in FIG. 12 flows through the reading-side coil 32, as described above. Therefore, even if a criminal attaches a signal wire to the pre-head 17 and acquires the waveform of the current flowing through the reading-side coil 32, it is difficult for him to distinguish between the reading current and the pseudo current. In the second embodiment particularly, the amplitude of the wave of the pseudo current is equal to that of the wave of the reading current. Also, in the second embodiment, the period of the wave of the pseudo current is the period determined by the recording density of the magnetic data recorded on the card 2 and the transporting speed of the card 2. Further, in the second embodiment, the period of the wave of the pseudo current varies irregularly within the range of the periods determined by the recording density of the magnetic data and the transporting speed of the card 2. For this reason, even if a criminal acquires the waveform of the current flowing through the reading-side coil 32, it is very difficult for him to acquire accurate magnetic information based on the reading current. Consequently in the second embodiment, the illegal acquisition of the magnetic information on the card 2 can be prevented.

Note that, in the second embodiment, as described above, the reading control circuit 42 demodulates the magnetic data based on the signal which is input during the time from ON to OFF of the card width sensor 21; therefore, even if the pseudo current is generated to the reading-side coil 32 outside the magnetic data reading time, the card reader 1 appropriately distinguishes between the reading current and the pseudo current to acquire accurate magnetic information.

In the second embodiment, the illegal acquisition of the magnetic information on the card 2 can be prevented without the demodulator circuit and encryption circuit being arranged in the pre-head 17; therefore, the pre-head 17 can be minimized in size and the cost of the pre-head 17 can be reduced. Thus, in the second embodiment, the card reader 1 can be minimized in size and the cost can be reduced.

In the second embodiment, the intensity of the magnetic field generated by the pre-head 17 when the pseudo current is applied to the reading-side coil 32 is much weaker than the coercivity of the magnetic stripe 2a. Therefore, even if an irregularly-shaped card 2 is inserted, the card 2 is not detected by the card insertion detecting mechanism 15 and then the card 2 makes contact with the pre-head 17 under the condition when the pseudo current is being generated to the reading-side coil 32, damage to the magnetic data recorded in the magnetic stripe 2a of the inserted card 2 due to the pseudo current can be prevented.

In the second embodiment, the reading control circuit 42 and the magnetic detection circuit 44 constantly oversee in Step S1 whether or not the pseudo current is generated to the reading-side coil 32. Therefore, as described above, it can detect that somebody has committed a crime, and therefore a predetermined process, such as the host device generating an alarm, can be carried out. Thus, in the second embodiment, the illegal acquisition of the magnetic information on the card 2 is prevented with certainty. Also, in the second embodiment, based on the detection result of the reading control circuit 42 and the magnetic detection circuit 44, the interruption of the reading-side coil 32 can be detected. Therefore, based on the detection result of the reading control circuit 42 and the magnetic detection circuit 44, the replacement timing for the pre-head 17 can be known, thus improving the reliability of the card reader 1.

Modification Example 1

Figure 14:
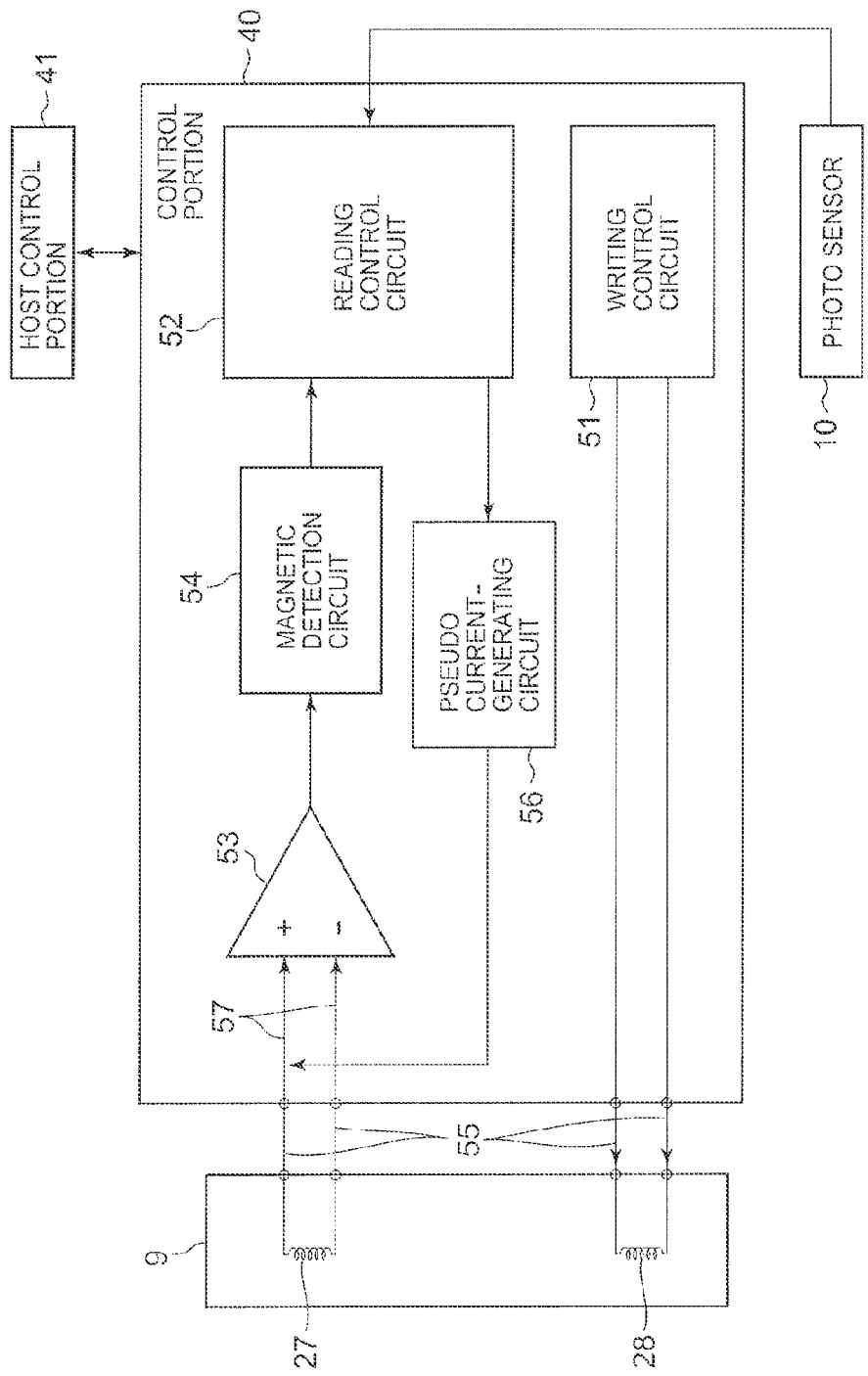
FIG. 14 shows a block diagram of the configuration of the control portion and its related portions of the modification example 1 of the second embodiment of the present invention.

FIG. 14 is a block diagram of the configuration of the control portion 40 and its related portions of a modification example 1 of the second embodiment of the present invention. Note that, in FIG. 14, only the configuration of the control portion 40 related to the control of the magnetic head 9 is illustrated.

In the above-described second embodiment, the pseudo current is generated to the reading-side coil 32 except for the period of time when the pre-head 17 is reading the magnetic data. Beside this, the pseudo current may be generated to the reading-side coil 27 except for the period of time when the magnetic head 9 is reading the magnetic data, for example. The configuration of the control portion 40 and an example of the control of the magnetic head 9 in this case are described hereinafter.

The control portion 40 is equipped with a writing control circuit 51 and a reading control circuit 52 as the components related to the control of the magnetic head 9. The writing control circuit 51 and the reading control circuit 52 are configured by a CPU, for example. The writing-side coil 28 of the magnetic head 9 is connected to the writing control circuit 51, and the writing current for writing magnetic data on the card 2 is generated to the writing-side coil 28 based on the output signal from the writing control circuit 51. In other words, the writing control circuit 51 is a writing current-generating means to apply the writing current for writing magnetic data to the writing-side coil 28.

The reading-side coil 27 of the magnetic head 9 is connected to the reading control circuit 52 via an amplifier circuit 53 and a magnetic detection circuit 54; the current applied to the reading-side coil 27 is amplified at the amplifier circuit 53 and input to the reading control circuit 52 via the magnetic detection circuit 54. Also, a photo sensor 10 is connected to the reading control circuit 52. Note that the reading-side coil 27 and the writing-side coil 28 of the magnetic head 9 and the circuit board are connected with each other by flexible printed circuits (FPC) or a connection cable 55 such as a lead wire.

Also, the control portion 40 is provided with a pseudo current-generating circuit 56 as a component related to the control of the magnetic head 9 for generating to the reading-side coil 27 a pseudo current which resembles the reading current flowing through the reading-side coil 27 when the magnetic data recorded on the card 2 is read. The pseudo current in this case is a non-reading current other than the reading current, and the pseudo current-generating circuit 56 is a non-reading current-generating means for generating the pseudo current which is a non-reading current.

The pseudo current-generating circuit 56 is connected to the reading control circuit 52, and a control signal of the reading control circuit 52 is input to the pseudo current-generating circuit 56. Also, the pseudo current-generating circuit 56 is connected to one side of the circuit pattern 57 which links the connection cable 55 and the amplifier circuit 53, and outputs a signal toward the one side of the circuit pattern 57. When the pseudo current-generating circuit 56 outputs a signal toward the one side of the circuit pattern 57, a pseudo current is generated to the reading-side coil 27. Note that, although the circuit pattern 57 is formed on the circuit board and the pseudo current-generating circuit 56 is connected to the one side of the circuit pattern 57 in the second embodiment, the pseudo current-generating circuit 56 may be connected to the connection cable 55 via a predetermined connection cable. The connection cable 55 and the circuit pattern 57 are the reading-side signal wires to which the reading-side coil 27 is connected.

In the same manner as the pseudo current-generating circuit 46, a pseudo current generating circuit 56 generates a pseudo current to the reading-side coil 27 except for the period of time when the magnetic head 9 is reading the magnetic data on the card 2. Also, the pseudo current-generating circuit 56 generates to the reading-side coil 27 a pseudo current composed of the wave having an amplitude equal to that of the wave of the reading current. Further, the pseudo current-generating circuit 56 generates to the reading-side coil 27 a pseudo current composed of the wave having a period corresponding to the recording density of the magnetic data recorded on the card 2. Also, the pseudo current-generating circuit 56 generates to the reading-side coil 27 a pseudo current in which the period thereof varies irregularly.

Note that the writing control circuit 51, the reading control circuit 52, the amplifier circuit 53, the magnetic detection circuit 54 and the pseudo current-generating circuit 56 are mounted on the circuit board.

The magnetic head 9 is controlled in the same manner as the pre-head 17. For instance, the magnetic head 9 is controlled in the following manner. In other words, the pseudo current generating circuit 56 generates a pseudo current to the reading-side coil 27 even when it is in the stand-by status where the card 2 is not inserted to the card reader 1. Also, the control portion 40 judges, based on the output signal from the photo sensor 10, whether or not the front end of the card 2 has reached the photo sensor 10. When the front end of the card 2 reaches the photo sensor 10 and the photo sensor 10 is turned on, the magnetic head 9 starts reading the magnetic data recorded on the magnetic stripe 2*a* immediately; therefore, when the photo sensor 10 is turned on, the pseudo current-generating circuit 56 suspends the pseudo current that has been generated to the reading-side coil 27.

After that, the control portion 40 judges, based on the output signal from the photo sensor 10, whether or not the rear end of the card 2 has passed the photo sensor 10. When the rear end of the card 2 passes the photo sensor 10 and the photo sensor 10 is turned off, the pseudo current-generating circuit 56 resumes generating the pseudo current to the reading-side coil 32 since the magnetic head 9 has finished reading the magnetic data right before that.

Even when the pseudo current is generated to the reading-side coil 27 except for the period of time when the magnetic head 9 is reading the magnetic data as described, the illegal acquisition of the magnetic information can be prevented in the same manner as the above-described embodiment. Also, the card reader 1 can be minimized in size and manufactured at lower cost. Note that, in this case, the photo sensor 10 is a reading status-detecting means for detecting that the magnetic head 9 is reading the magnetic data.

Modification Example 2

Figure 15:
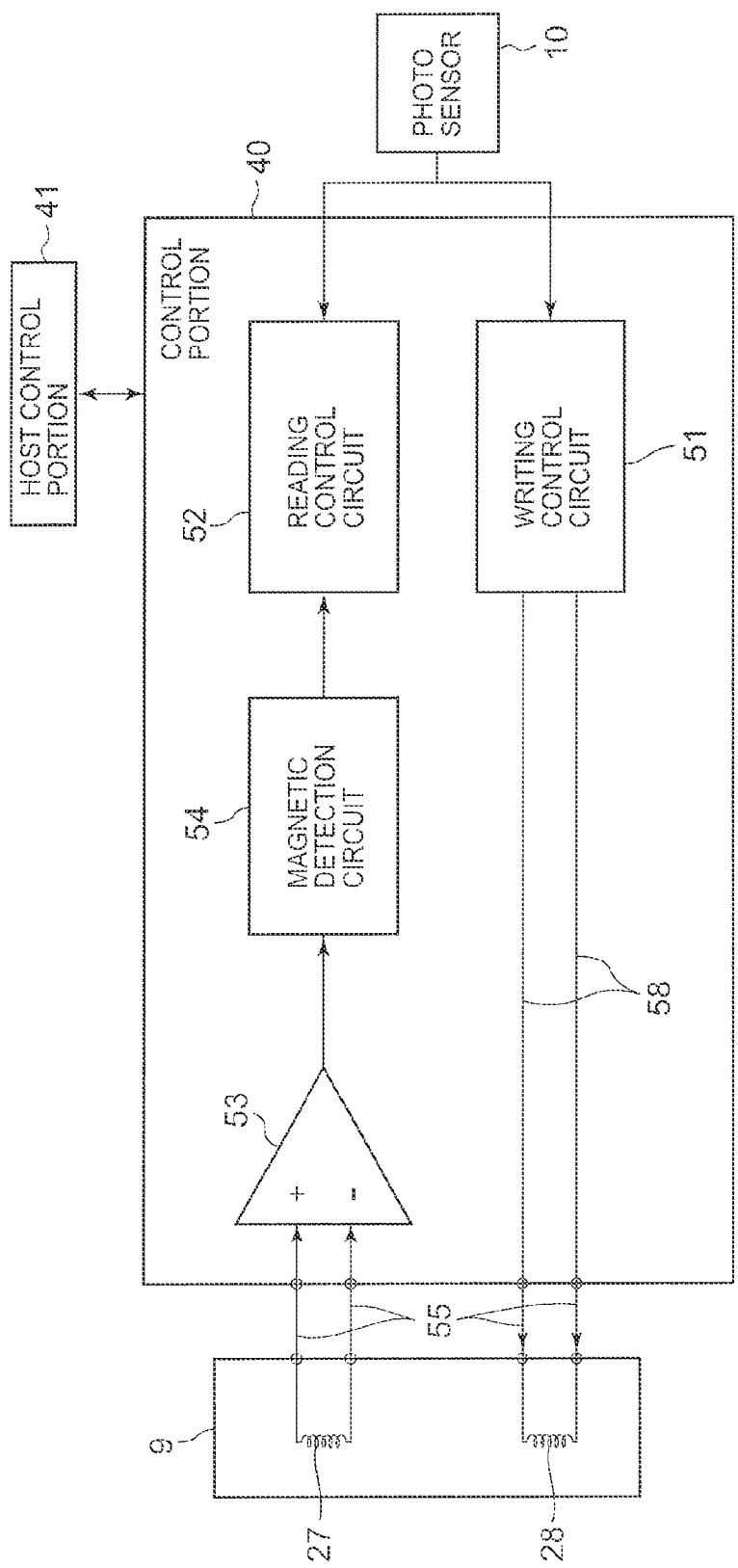
FIG. 15 shows a block diagram of the configuration of the control portion and its related portions of the modification example 2 of the second embodiment of the present invention.

FIG. 15 is a block diagram showing the configuration of a control portion 40 and its related portions of the modification example 2 of the second embodiment of the present invention. Note that only the configuration of the control portion 40 related to the control of the magnetic head 9 is illustrated in FIG. 15.

In the above-described modification example 1, the pseudo current-generating circuit 56 is connected to the one side of the circuit pattern 57; when the pseudo current-generating circuit 56 outputs a signal toward the one side of the circuit pattern 57, a pseudo current is generated to the reading-side coil 27. In other words, in the above-described modification example 1, a signal is supplied to the reading-side coil 27 to generate a pseudo current to the reading-side coil 27. Beside this, a signal may be supplied to the writing-side coil 28 to generate a current to the writing-side coil 28 so that electromagnetic induction is used to generate a pseudo current to the reading-side coil 27.

In this case, while the pseudo current-generating circuit 56 may be connected to the circuit pattern that links the writing control circuit 51 and the connection cable 55, the writing control circuit 51 may be used to generate a current to the writing-side coil 28 to generate a pseudo current to reading-side coil 27. In other words, the writing control circuit 51 may be given the function of the pseudo current-generating circuit 56. In other words, the writing control circuit 51 can be the non-reading current-generating means for generating a pseudo current which is s non-reading current.

When the writing control circuit 51 is used as the non-reading current-generating means, the pseudo current-generating circuit 56 is not necessary as shown in FIG. 15. Also, in this case, the photo sensor 10 is connected to the writing control circuit 51. Also, the writing control circuit 51 is equipped with an attenuation circuit (illustration omitted) for reducing the induction current, which is applied to the writing-side coil 28 when a pseudo current is generated to the reading-side coil 27, so that it is smaller than the writing current. Also, the writing control circuit 51 is connected to the writing-side coil 28 via the circuit pattern 58 formed on the circuit board and the connection cable 55. The connection cable 55 and the circuit pattern 58 are the writing-side signal wires to which the writing-side coil 28 is connected.

The writing control circuit 51 generates an induction current to the writing-side coil 28 so that a pseudo current is generated to the reading-side coil 27 except for the period of time when the magnetic head 9 is reading the magnetic data on the card 2. At that time, the writing control circuit 51 generates an induction current to the writing-side coil 28 so that a pseudo current composed of the wave having an amplitude equal to that of the wave of the reading current is generated to the reading-side coil 27. The writing control circuit 51 generates an induction current to the writing-side coil 28 so that a pseudo current composed of the wave having a period corresponding to the recording density of the magnetic data recorded on the card 2, is generated to the reading-side coil 27. Also, the writing control circuit 51 generates an induction current to the writing-side coil 28 so that a pseudo current in which the period thereof varies irregularly is generated to the reading-side coil 27. Note that the intensity of the magnetic field generated by the magnetic head 9 when the induction current is applied to the writing-side coil 28 is very weak compared to the coercivity of the magnetic stripe 2a.

In this case, the magnetic head 9 is controlled in the following manner. More precisely, the writing control circuit 51 generates an induction current to the writing-side coil 28 so that a pseudo current is generated to the reading-side coil 27 even when it is in the stand-by status where the card 2 is not inserted to the card reader 1. The control portion 40 judges based on the output signal from the photo sensor 10 whether or not the front end of the card 2 has reached the photo sensor 10. When the front end of the card 2 reaches the photo sensor 10 and the photo sensor 10 is turned on, the magnetic head 9 immediately starts reading the magnetic data recorded on the magnetic stripe 2a; therefore, when the photo sensor 10 is turned on, the writing control circuit 51 suspends the induction current which has been generated to the writing-side coil 28 to suspend the pseudo current generated to the reading-side coil 27.

After that, the control portion 40 judges based on the output signal from the photo sensor 10 whether or not the rear end of the card 2 has passed the photo sensor 10. When the rear end of the card 2 passes the photo sensor 10 and the photo sensor is turned off, the writing control circuit 51 generates the induction current to the writing-side coil 28 to generate the pseudo current to the reading-side coil 32 since the magnetic head 9 has finished reading the magnetic data right before that.

Even when the current is generated to the writing-side coil 28 and electromagnetic induction is used to generate a pseudo current to the reading-side coil 27 in this manner, the same effect as in the above-described embodiment can be obtained. Also, when the current is applied to the writing-side coil 28 by using the writing control circuit 51 to generate a pseudo current to the reading-side coil 27, the pseudo current-generating circuit 56 is not needed, thus simplifying the configuration of the control portion 40.

Modification Example 3

Figure 16:
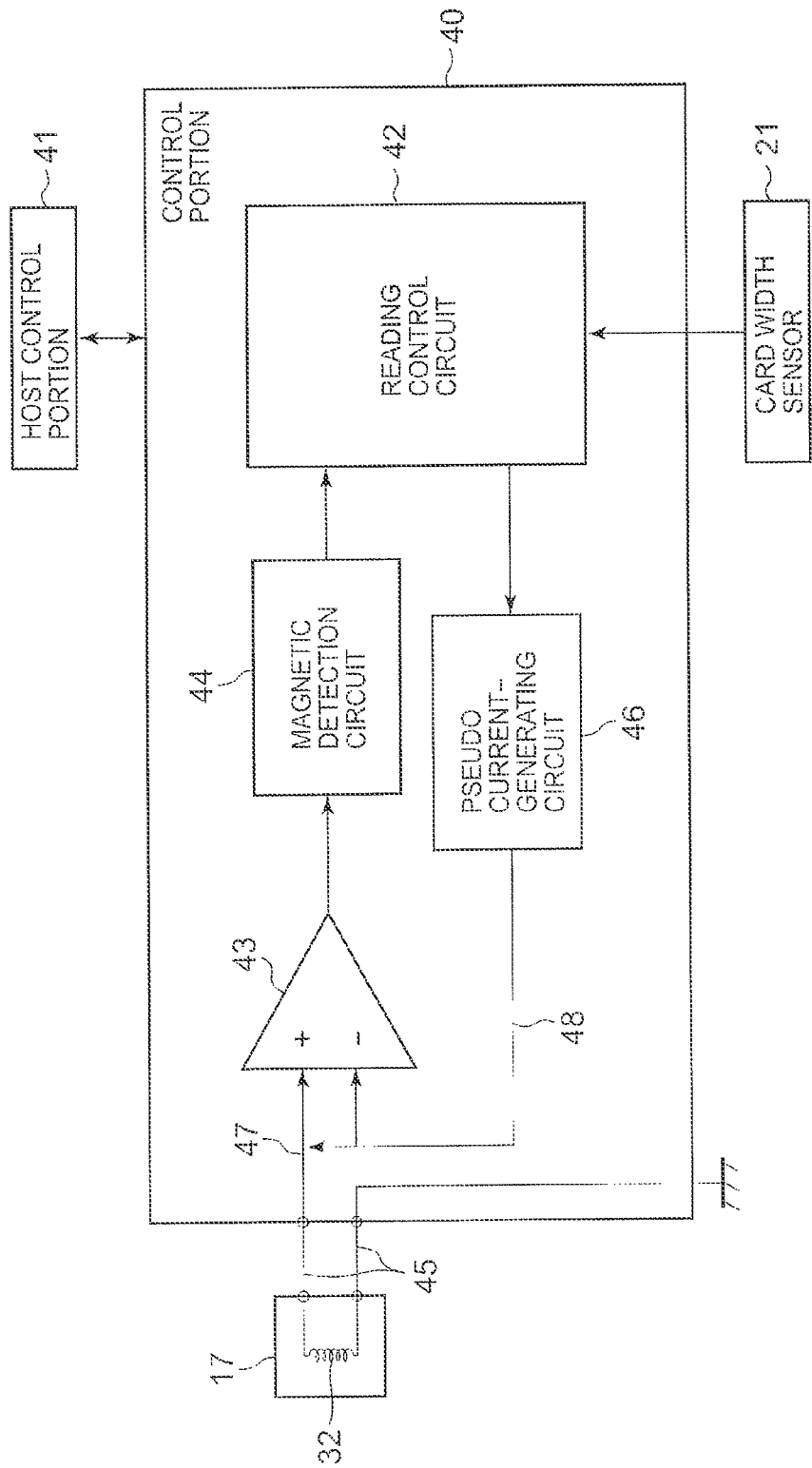
FIG. 16 shows a block diagram of the configuration of the control portion and its related portions of the modification example 3 of the second embodiment of the present invention.
Figure 17:
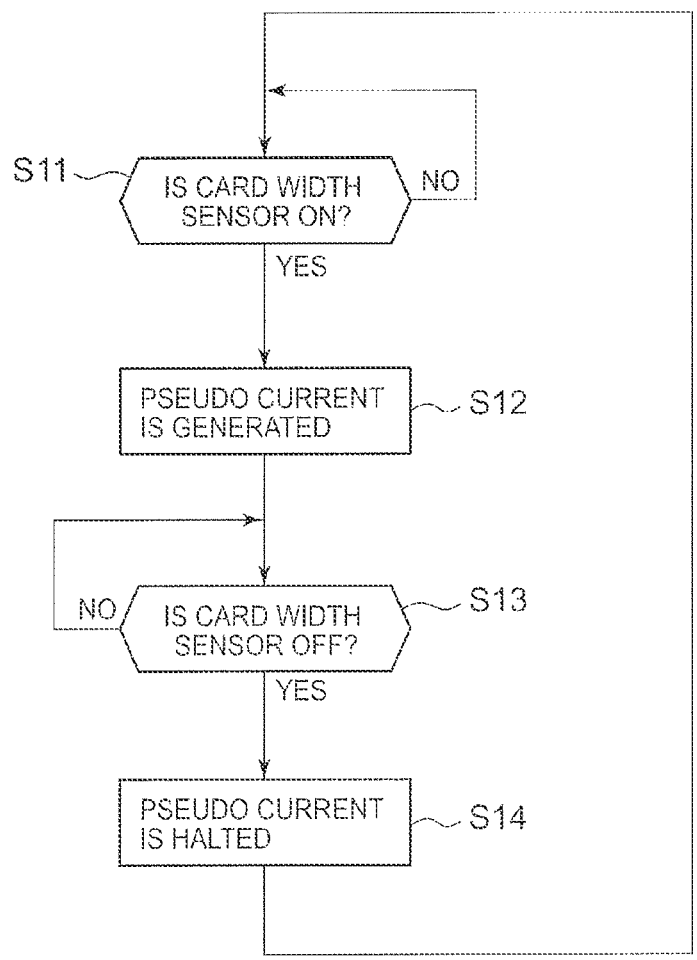
FIG. 17 shows a flowchart of another example of the control of the pre-head shown in FIG. 8.

FIG. 16 is a block diagram of the configuration of a control portion 40 and its related portions of the modification example 3 of the second embodiment of the present invention. FIG. 17 is a flowchart showing another example of the control of the pre-head 17 shown in FIG. 8. Note that, in FIG. 16, only the configuration of the control portion 40 related to the control of the pre-head 17 is illustrated.

In the above-described second embodiment, the pseudo current-generating circuit 46 generates a pseudo current to the reading-side coil 32 except for the period of time when the pre-head 17 is reading the magnetic data on the card 2. Beside this, when a circuit for cancelling out the pseudo current component of the current flowing through the reading-side coil 32 is mounted on the circuit board, a pseudo current may be generated to the reading-side coil 32 even when the pre-head 17 is reading the magnetic data on the card 2. The configuration of the control portion 40 and an example of the control of the pre-head 17 in this case is described hereinafter.

In this case, as shown in FIG. 16, one end of the reading-side coil 32 is connected to a non-inverting input of the amplifier circuit 43 via the connection cable 45 and the circuit pattern 47; the other end of the reading-side coil 32 is grounded via the connection cable 45. Also, the circuit pattern 48 linked to the output side of the pseudo current-generating circuit 46 is split into two; one part is connected to the circuit pattern 47 and the other is connected to the inverting input of the amplifier circuit 43.

Therefore, in this case, the pseudo current component is cancelled out of the current flowing through the reading-side coil 32 at the amplifier circuit 43. In other words, the amplifier circuit 43 of the second embodiment is a non-reading current component-cancelling means that cancels out the component of the pseudo current, which is the non-reading current, of the current applied to the reading-side coil 32.

In this case, also, the pre-head 17 is controlled in the following manner, for example. More precisely, in the stand-by status where the card 2 is not inserted to the card reader 1, the control portion 40 judges whether or not the card width sensor 21 is turned on (Step S11). More precisely, the control portion 40 judges based on the output signal from the card width sensor 21 whether or not the card 2 is inserted from the card insertion slot 4. When the card 2 is inserted from the card insertion slot 4 and the card width sensor 21 is turned on (that is, "Yes" in Step S11), the pre-head 17 immediately starts reading the magnetic data recorded on the magnetic stripe 2a; therefore, the pseudo current-generating circuit 46 starts generating a pseudo current to the reading-side coil 32 (Step S12). Note that, in Step S12, the pseudo current component is cancelled out of the current applied to the reading-side coil 32 at the amplifier circuit 43 mounted on the circuit board as described above.

In this status, the control portion 40 judges whether or not the card width sensor 21 is turned off (Step S13). More precisely, the control portion 40 judges based on the output signal from the card width sensor 21 whether or not the rear end of the card 2 has passed the sensor lever 20. When the rear end of the card 2 passes the sensor lever 20 and the card width sensor 21 is turned off (that is, "Yes" in Step S13), the pseudo current-generating circuit 46 stops generating the pseudo current to the reading-side coil 32 (Step S14) since the pre-head 17 has finished reading the magnetic data right before the sensor is turned off, and then the process returns to Step S11.

In this manner, based on the detection result of the card width sensor 21, the pseudo current is generated to the reading-side coil 32 right before the pre-head 17 starts reading the magnetic data. Also, based on the detection result of the card width sensor 21, the pseudo current which has been generated to the reading-side coil 32 is halted immediately after the pre-head 17 finishes reading the magnetic data. Then, the pseudo current component is cancelled out of the current flowing through the reading-side coil 32 at the amplifier circuit 43 as described above; therefore, even though the pseudo current is being generated to the reading-side coil 32 during the time the magnetic data is being read, the reading control circuit 42 can demodulate the appropriate magnetic data and the card reader 1 can obtain the accurate magnetic information. Also, the intensity of the magnetic field generated by the pre-head 17 when the pseudo current is applied to the reading-side coil 32 is much weaker than the coercivity of the magnetic stripe 2*a*; therefore, the destruction of the magnetic data recorded on the magnetic stripe 2*a* by the influence of the pseudo current can be prevented.

Note that, in this case, Step S12 is a non-reading current-generating step which start generating a pseudo current as a non-reading current to the reading-side coil 32 right before the pre-head 17 starts reading the magnetic data. Step S14 is a non-reading current-halting step which stops generating the pseudo current to the reading-side coil 32 after the pre-head 17 finishes reading the magnetic data.

In case that the pseudo current is being generated to the reading-side coil 32 during the time when the pre-head 17 is reading the magnetic data on the card 2, even if a criminal attaches a signal wire to the pre-head 17 and acquires the waveform of the current flowing through the reading-side coil 32, it is difficult for the criminal to acquire accurate magnetic information based on the reading current because the pseudo current is superimposed on the reading current. Therefore, in the same manner as the above-described second embodiment, the illegal acquisition of the magnetic information on the card 2 can be prevented. Also, since only a pseudo current needs to be generated to the reading-side coil 32 at the magnetic data reading in this case, energy can be saved in the card reader 1. Further, a current is not applied to the reading-side coil 32 except for the time the magnetic data is being read; therefore, it is hard for a criminal to be aware that the card reader 1 has a measure to prevent the illegal acquisition of magnetic information on the card 2. Therefore, security on the card reader 1 can be increased.

Note that, even in the case that the pseudo current component is cancelled out of the current flowing through the reading-side coil 32 at the amplifier circuit 43, the pseudo current may be also generated to the reading-side coil 32 other than the period of time when the pre-head 17 is reading the magnetic data on the card 2. Also, in the case that the pseudo current component is cancelled out of the current flowing through the reading-side coil 32 at the amplifier circuit 43, the pseudo current may be constantly generated to the reading-side coil 32. The control portion 40 may be configured so that the pseudo current component is cancelled out of the current flowing through the reading-side coil 27 at the amplifier circuit 53 in the same manner.

Other Embodiment

The above-described second embodiment and its modification examples are the examples of the preferred second embodiment of the present invention; however, the present invention is not limited to these, but can be modified variously within the scope of the present invention.

In the above-described second embodiment and its modification examples, a pseudo current which resembles the reading current is generated to the reading-side coils 27, 32. More precisely described, the pseudo current, which is composed of the wave having an amplitude equal to that of the wave of the reading current and also is composed of the wave having a period corresponding to the recording density of the magnetic data recorded on the card 2, is generated to the reading-side coils 27, 32. Beside this, a non-reading current which does not resemble the reading current may be generated to the reading-side coils 27, 32, in place of the pseudo current. In other words, a non-reading current composed of the wave having an amplitude different from that of the wave of the reading current may be generated to the reading-side coils 27, 32 or a non-reading current composed of the wave having a period which does not correspond to the recording density of the magnetic data may be generated to the reading-side coils 27, 32.

Also in the above-described second embodiment and its modification examples, as shown in FIG. 12, a pseudo current in which the period thereof varies irregularly is generated to the reading-side coils 27, 32; however, a pseudo current whose period varies regularly or a pseudo current having a constant period may be generated to the reading-side coils 27, 32.

In the above-described second embodiment and its modification examples, the card reader 1 is a card-transporting-type card reader provided with the card transporting mechanism 8; however, it may be a manual card reader at which, while a user moves a card by hand, the magnetic data recorded on the card is read. For example, the card reader to which the configuration of the present invention is applied may be a so-called swipe-type card reader in which, while a card is moved along a grooved card path formed shallower than the card's lateral width, the magnetic data on the card is read; it may be a so-called dip-type card reader which reads magnetic data when a card is inserted into the card reader or when the card is pulled out of the card reader.

POSSIBILITY OF INDUSTRIAL USE

The card reader of the present invention is useful to make it possible to prevent the illegal acquisition of magnetic information through the pre-head. Further, the card reader of the present invention is useful to make it possible to prevent the illegal acquisition of magnetic information of cards and to minimize the size of the card reader and lower the cost.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1, 101 Card reader
2 Card
2*a* Magnetic stripe
9, 107 Magnetic head
10 Photo sensor (Reading status-detecting means)
15 Card insertion detecting mechanism (Reading status-detecting means)
17, 104, 40 Pre-head (Magnetic head)
25, 31 Reading core
26 Writing core
27, 32 Reading-side coil
28 Writing-side core
42, 52 Reading control circuit (non-reading current-detecting means)
43, 53 Amplifier circuit (Non-reading current component-cancelling means)
44, 54 Magnetic detection circuit (Non-reading current-detecting means)
45 Connection cable (read-side signal wire)
46, 56 Pseudo current generating circuit (Non-reading current-generating means)
47 Circuit pattern (Read-side signal wire)

51 Writing control circuit (Writing current-generating means, non-reading current-generating means)
55 Connection cable (Writing-side signal wire)
58 Circuit pattern (Writing-side signal wire)
102 Transport passage
103 Card insertion slot
105 Shutter
108 Drive motor
111d-111f Drive roller
300 Circuit board
301 CPU
302 Encoder
303 Detection circuit
304 Drive motor control means
305 Shutter open-close control means
S1 Non-reading current-generating step, Non-reading current-regenerating step
S3 Non-reading current-suspending step
S12 Non-reading current-generating step
S14 Non-reading current-halting step

The invention claimed is:

1. A card reader comprising:
 a card insertion slot configured to guide a magnetic card having a magnetic stripe to a transport passage;
 a pre-head arranged in the vicinity of said card insertion slot configured to detect the presence of said magnetic stripe; and
 a magnetic head disposed in an inside of the card reader for reading magnetic data from and writing magnetic data to the magnetic stripe of the magnetic card when the magnetic card is taken into the inside of the card reader through an output signal from the pre-head;
 wherein said pre-head includes:
 a head portion which has at least one pair of magnetic cores arranged to be opposite from each other, with a magnetic gap arranged between the magnetic cores to produce a signal indicating magnetic data recorded on the magnetic stripe;
 a signal converting part converting the signal indicating the magnetic data into periodic pulses or a constant holding signal different from the magnetic data recorded on said magnetic stripe as the output signal from the pre-head so that the signal indicating the magnetic data is not outputted from the pre-head; and
 coils wound around the pair of magnetic cores; and
 wherein the periodic pulses or the constant holding signal output from the signal converting part of the pre-head is input to the card reader as a sign for taking the magnetic card into the inside of the card reader; and
 wherein said signal converting part is equipped with a detection circuit for detecting the signal indicating magnetic data recorded on the magnetic stripe from said head portion and an output circuit for outputting the periodic pulses or the constant holding signal as the output signal from the pre-head.

2. The card reader according to claim 1;
 wherein said signal converting part is disposed in an inside of a case covering a pair of said magnetic cores and said coils.

3. The card reader according to claim 1;
 wherein said pre-head is a multi-channel magnetic head in which said head portion is provided in multiple to correspond to a plurality of data tracks; and
 wherein a common bobbin, around which a coil is wound, is attached to a plurality of said magnetic cores.

4. The card reader according to claim 1, further comprising:
 a drive motor configured to drive rollers so that the magnetic card is taken into the inside of the card reader when the pre-head detects the magnetic stripe;
 wherein when the output signal from the pre-head is recognized, the drive motor is driven so that the magnetic card is taken into the inside of the card reader.

5. The card reader according to claim 1, further comprising:
 a shutter configured to allow the magnetic card to be taken into the inside of the card reader when the pre-head detects the magnetic stripe;
 wherein, when the output signal from the pre-head is recognized, the shutter is operated so that the magnetic card is taken into the inside of the card reader.

* * * * *